(12) United States Patent
Shinohara et al.

(10) Patent No.: US 11,088,471 B2
(45) Date of Patent: Aug. 10, 2021

(54) TERMINAL-ATTACHED ELECTRIC WIRE AND WIRE HARNESS

(71) Applicant: Yazaki Corporation, Tokyo (JP)

(72) Inventors: Junya Shinohara, Shizuoka (JP); Naoki Ikeno, Shizuoka (JP); Ryuji Sugizaki, Shizuoka (JP); Yoshitaka Itou, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/859,652

(22) Filed: Apr. 27, 2020

(65) Prior Publication Data

US 2020/0381846 A1 Dec. 3, 2020

(30) Foreign Application Priority Data

May 29, 2019 (JP) .............................. JP2019-100064

(51) Int. Cl.
*H01R 4/18* (2006.01)
*H01R 4/02* (2006.01)
*H01R 43/02* (2006.01)
*H01B 13/012* (2006.01)
*H01R 4/70* (2006.01)
(Continued)

(52) U.S. Cl.
CPC .............. *H01R 4/185* (2013.01); *B23K 20/10* (2013.01); *H01B 13/012* (2013.01); *H01R 4/02* (2013.01); *H01R 4/48* (2013.01); *H01R 4/70* (2013.01); *H01R 13/11* (2013.01); *H01R 43/0207* (2013.01); *H01R 2201/26* (2013.01)

(58) Field of Classification Search
CPC .......... H01R 4/185; H01R 4/188; H01R 4/02; H01R 4/48; H01R 4/70; H01R 43/0207; H01R 2201/26; H01R 13/11; H01B 13/012; H01B 13/11
USPC ........................................................ 439/877
See application file for complete search history.

(56) References Cited

U.S. PATENT DOCUMENTS 5,593,328 A * 1/1997 Okada .................... H01R 13/11
                                                    439/843
5,707,259 A * 1/1998 Ishizuka .............. H01R 13/115
                                                    439/852
(Continued)

FOREIGN PATENT DOCUMENTS

JP          2007-294154 A     11/2007

*Primary Examiner* — Peter G Leigh
(74) *Attorney, Agent, or Firm* — Kenealy Vaidya LLP

(57) ABSTRACT

In a terminal-attached electric wire applied to a wire harness, a metal terminal includes: an electric wire connection portion to which the electric wire is connected; a box-shaped portion that is formed into a box shape by a bottom body coupled to the electric wire connection portion and a pair of wall bodies formed by protruding individually from both ends of the bottom body in a width direction, and enables a counterpart terminal to be inserted into a terminal insertion space portion in an inside thereof along an axial direction intersecting the width direction; and a spring contact portion that is located inside the terminal insertion space portion, is elastically deformably supported in the box-shaped portion in a cantilever manner, and forms a contact with the counterpart terminal, and wherein the box-shaped portion has a displacement regulating portion that regulates a relative displacement between the pair of the wall bodies.

6 Claims, 15 Drawing Sheets

(51) Int. Cl.
*H01R 4/48* (2006.01)
*H01R 13/11* (2006.01)
*B23K 20/10* (2006.01)

(56) References Cited

U.S. PATENT DOCUMENTS

| | | | | |
|---|---|---|---|---|
| 6,478,636 B1* | 11/2002 | Makita | ................. | H01R 13/115 |
| | | | | 439/852 |
| 6,905,376 B2* | 6/2005 | Chen | ................. | H01R 13/115 |
| | | | | 439/852 |
| 6,971,927 B2* | 12/2005 | Anbo | ................. | H01R 13/113 |
| | | | | 439/852 |
| 7,419,410 B2* | 9/2008 | Myer | ................. | H01R 13/11 |
| | | | | 439/852 |
| 7,530,859 B2* | 5/2009 | Moll | ................. | H01R 13/11 |
| | | | | 439/852 |
| 7,976,351 B2* | 7/2011 | Boemmel | ............ | H01R 13/432 |
| | | | | 439/748 |
| 7,985,106 B2* | 7/2011 | Sugiyama | .............. | H01R 11/22 |
| | | | | 439/852 |
| 7,988,505 B2* | 8/2011 | Hotea | ................. | H01R 13/11 |
| | | | | 439/852 |
| 8,118,209 B2* | 2/2012 | Ohnuma | ................. | B23K 1/06 |
| | | | | 228/110.1 |
| 8,333,622 B2* | 12/2012 | Blasko | ................. | H01R 11/22 |
| | | | | 439/852 |
| 9,011,188 B2* | 4/2015 | Aoki | ................. | H01R 4/02 |
| | | | | 439/874 |
| 9,105,995 B2* | 8/2015 | Tsuji | ................. | H01R 13/11 |
| | | | | 439/852 |
| 9,118,130 B1* | 8/2015 | Volpone | ................. | H01R 13/11 |
| | | | | 439/852 |
| 9,236,675 B2* | 1/2016 | Tsuji | ................. | H01R 13/187 |
| | | | | 439/852 |
| 9,843,151 B2* | 12/2017 | Miyakawa | ............ | H01R 13/02 |
| | | | | 439/843 |
| 10,090,608 B2* | 10/2018 | Lewis | ................. | H01R 11/22 |
| | | | | 439/852 |
| 10,297,940 B2* | 5/2019 | Tanikawa | ............... | H01R 13/11 |
| | | | | 439/852 |
| 2003/0049975 A1* | 3/2003 | Tsuji | ................. | H01R 13/115 |
| | | | | 439/843 |
| 2019/0052040 A1* | 2/2019 | Suzuki | ................. | H01R 43/02 |
| | | | | 439/852 |
| 2019/0096543 A1* | 3/2019 | Itou | ................. | H01B 7/282 |

* cited by examiner

TERMINAL-ATTACHED ELECTRIC WIRE AND WIRE HARNESS

CROSS-REFERENCE TO RELATED APPLICATION(S)

The present application claims priority to and incorporates by reference the entire contents of Japanese Patent Application No. 2019-100064 filed in Japan on May 29, 2019.

BACKGROUND OF THE INVENTION

1. Field of the Invention

The present invention relates to a terminal-attached electric wire and a wire harness.

2. Description of the Related Art

In Japanese Patent Application Laid-open No. 2007-294154, as a technology regarding a conventional terminal-attached electric wire and a wire harness, for example, disclosed is a terminal-attached electric wire welding method for performing ultrasonic welding for a terminal-attached electric wire provided with a terminal on at least one end thereof. In this method, a vibration damping portion formed by deforming the terminal-attached electric wire itself into a predetermined shape is formed between the terminal and a welded region in the electric wire, and the ultrasonic welding is performed in that state.

Incidentally, in the above-mentioned terminal-attached electric wire welding method described in Japanese Patent Application Laid-open No. 2007-294154, for example, it is desired that conduction performance be ensured appropriately also in the terminal already subjected to the ultrasonic welding as described above.

SUMMARY OF THE INVENTION

The present invention has been made in view of the circumstances described above. It is an object of the present invention to provide a terminal-attached electric wire and a wire harness which are capable of ensuring appropriate conduction performance.

In order to solve the above mentioned problem and achieve the object, a terminal-attached electric wire according to one aspect of the present invention includes an electric wire having conductivity; and a metal terminal provided on a terminal end of the electric wire, wherein the metal terminal includes: an electric wire connection portion to which the electric wire is connected; a box-shaped portion that is formed into a box shape by a bottom body coupled to the electric wire connection portion and a pair of wall bodies formed by protruding individually from both ends of the bottom body in a width direction, and enables a counterpart terminal to be inserted into a terminal insertion space portion in an inside thereof along an axial direction intersecting the width direction; and a spring contact portion that is located inside the terminal insertion space portion, is elastically deformably supported in the box-shaped portion in a cantilever manner, and forms a contact with the counterpart terminal, and the box-shaped portion has a displacement regulating portion that regulates a relative displacement between the pair of the wall bodies.

According to another aspect of the present invention, in the terminal-attached electric wire, it is preferable that the displacement regulating portion is configured to include: a recess provided in one of the pair of the wall bodies; and a protrusion provided in the other of the pair of the wall bodies and is fitted to the recess.

According to still another aspect of the present invention, in the terminal-attached electric wire, it is preferable that each of the pair of the wall bodies includes: a side wall portion that extends from the bottom body along a height direction intersecting the axial direction and the width direction; and a top surface portion that extends from the side wall portion along the width direction, and faces the bottom body with the terminal insertion space portion interposed therebetween along the height direction, the recess is provided in the top surface portion located on the terminal insertion space portion side between a pair of the top surface portions, the recess being provided by penetrating the top surface portion, and the protrusion is provided in the top surface portion located on an opposite side to the terminal insertion space portion between the pair of the top surface portions.

According to still another aspect of the present invention, in the terminal-attached electric wire, it is preferable that each of the pair of the wall bodies includes: a side wall portion that extends from the bottom body along a height direction intersecting the axial direction and the width direction; and a top surface portion that extends from the side wall portion along the width direction, and faces the bottom body with the terminal insertion space portion interposed therebetween along the height direction, the recess is provided in the top surface portion located on an opposite side to the terminal insertion space portion side between a pair of the top surface portions, the recess being provided by penetrating the top surface portion, and the protrusion is provided in the top surface portion located on the terminal insertion space portion between the pair of the top surface portions.

According to still another aspect of the present invention, in the terminal-attached electric wire, it is preferable that each of the pair of the wall bodies includes: a side wall portion that extends from the bottom body along a height direction intersecting the axial direction and the width direction; and a top surface portion that extends from the side wall portion along the width direction, and faces the bottom body with the terminal insertion space portion interposed therebetween along the height direction, and the displacement regulating portion is provided in one of the pair of the top surface portions, and is configured to include a clamping portion that clamps the other of the pair of the top surface portions.

According to still another aspect of the present invention, in the terminal-attached electric wire, it is preferable that the spring contact portion is supported on the bottom body.

According to still another aspect of the present invention, in the terminal-attached electric wire, it is preferable that the electric wire connection portion forms an ultrasonic bonding portion subjected to ultrasonic bonding to the electric wire.

In order to achieve the object, a wire harness according to still another aspect of the present invention includes at least one terminal-attached electric wire including an electric wire having conductivity and a metal terminal provided on a terminal end of the electric wire; a connection counterpart electric wire connected to the electric wire; and an ultrasonic bonding portion in which the electric wire and the connection counterpart electric wire are subjected to ultrasonic bonding, wherein the metal terminal includes: an electric wire connection portion to which the electric wire is connected; a box-shaped portion that is formed into a tube shape by a bottom body coupled to the electric wire connection portion and a pair of wall bodies formed by protruding from both ends of the bottom body in a width direction, and enables a counterpart terminal to be inserted into a terminal insertion space portion in an inside thereof along an axial direction intersecting the width direction; and a spring contact portion that is located inside the terminal insertion space portion, is elastically deformably supported in the box-shaped portion in a cantilever manner, and forms a contact with the counterpart terminal, and the box-shaped portion has a displacement regulating portion that regulates a relative displacement between the pair of the wall bodies.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

A detailed description will be given below of embodiments according to the present invention with reference to the drawings. Note that this invention is not limited to the embodiments. Moreover, constituents in the following embodiments include those which are substitutable and easy to substitute by those skilled in the art, or include substantially the same ones.

Note that FIG. 4 and FIG. 5 which are described below illustrate a state in which housings of connectors C and a protection member are detached. Moreover, in the following description, among a first direction, a second direction, and a third direction, which intersect one another, the first direction will be referred to as an "axial direction X", the second direction will be referred to as a "width direction Y", and the third direction will be referred to as a "height direction Z", Here, the axial direction X, the width direction Y, and the height direction Z are substantially perpendicular to one another. Typically, the axial direction X corresponds to an extending direction of an electric wire provided with a metal terminal, and corresponds to an inserting/removing direction between the metal terminal and a counterpart terminal. The width direction Y and the height direction Z correspond to intersecting directions which intersect the axial direction X. Moreover, the respective directions for use in the following description are defined to represent directions in a state in which respective portions are assembled to one another unless otherwise specified.

First Embodiment

Figure 1:
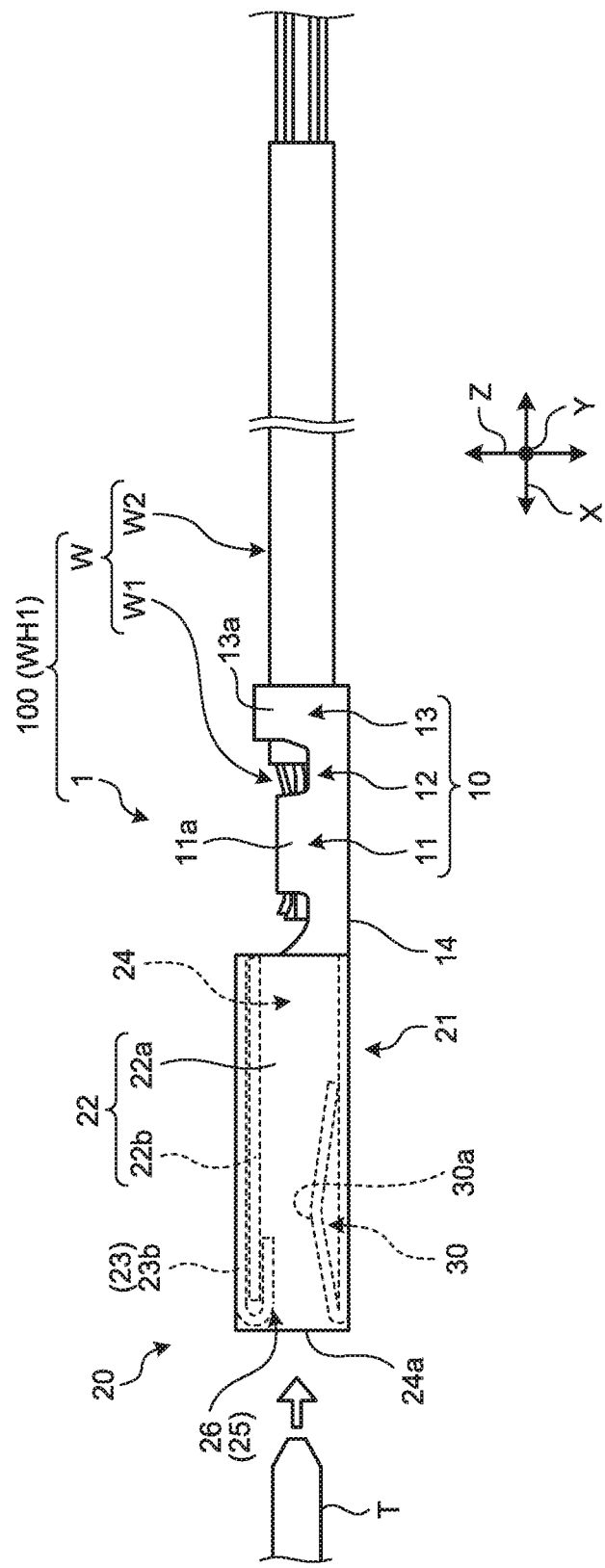
FIG. 1 is a schematic side view illustrating a schematic configuration of a terminal-attached electric wire according to a first embodiment.
Figure 2:
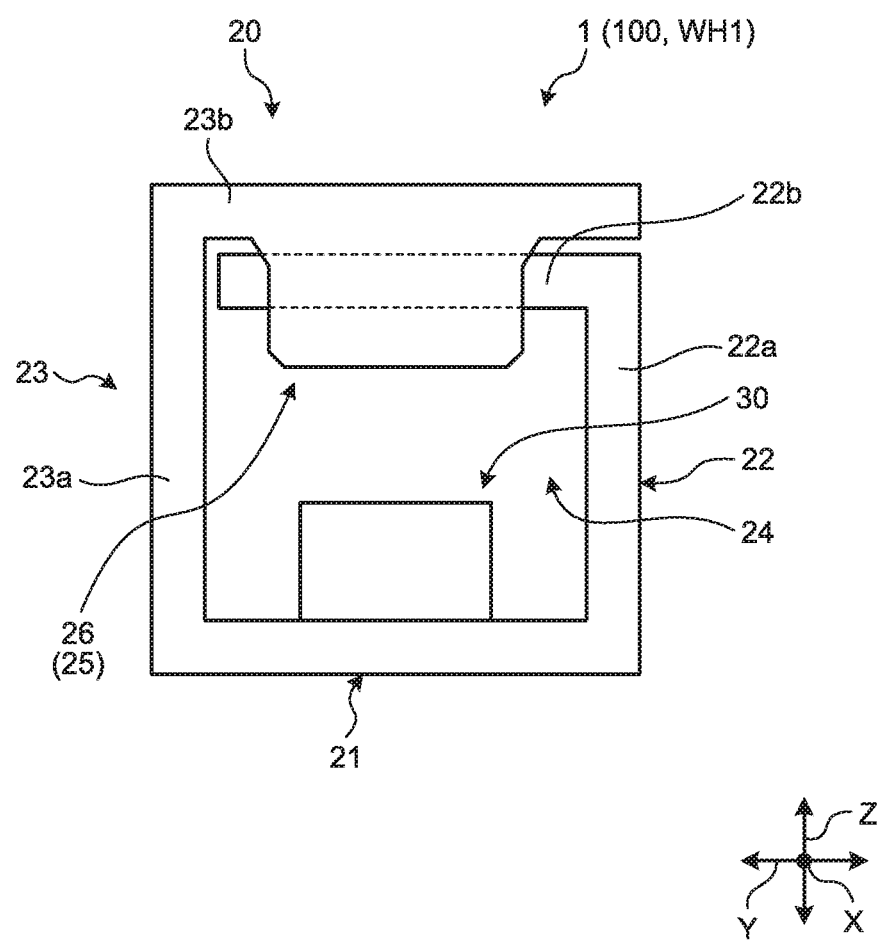
FIG. 2 is a schematic front view illustrating the schematic configuration of the terminal-attached electric wire according to the first embodiment.

A terminal-attached electric wire 100 according to this embodiment, which is illustrated in FIG. 1 and FIG. 2, includes: an electric wire W having conductivity; and a metal terminal 1 provided on a terminal end of the electric wire W. The terminal-attached electric wire 100 according to this embodiment is applied, for example, to a wire harness WH1 for use in a vehicle or the like.

For example, the electric wire W is configured to include a linear conductor portion W1 having conductivity and an insulation coating portion W2 having insulating properties and coating an outside of the conductor portion W1. The electric wire W is an insulated electric wire in which the conductor portion W1 is coated with the insulation coating portion W2. The conductor portion W1 is a core wire in which a plurality of element wires of conductive metal, for example, copper, a copper alloy, aluminum, an aluminum alloy or the like are bundled together. The conductor portion W1 may be a stranded core wire in which the plurality of element wires are stranded together. The insulation coating portion W2 is an electric wire coating that coats an outer circumferential side of the conductor portion W1. The insulation coating portion W2 is formed by performing extrusion molding, for example, for an insulating resin material or the like. The insulating resin material is PP, PVC, crosslinked PE or the like, and is appropriately selected in consideration of wear resistance, chemical resistance, heat resistance and the like. The electric wire W is stripped of the insulation coating portion W2 on at least one terminal end of the conductor portion W1, and one terminal end of the conductor portion W1 is exposed from the insulation coating portion W2, and the metal terminal 1 is provided on the exposed terminal end of the conductor portion W1. The metal terminal 1 is conducted with the conductor portion (core wire) W1 of the electric wire W. The metal terminal 1 is held, for example, in a connector C (see FIG. 3 and the like) to be described later. The metal terminal 1 of this embodiment is a crimp terminal to be crimped to the terminal end of the electric wire W, but is not limited to this.

Figure 3:
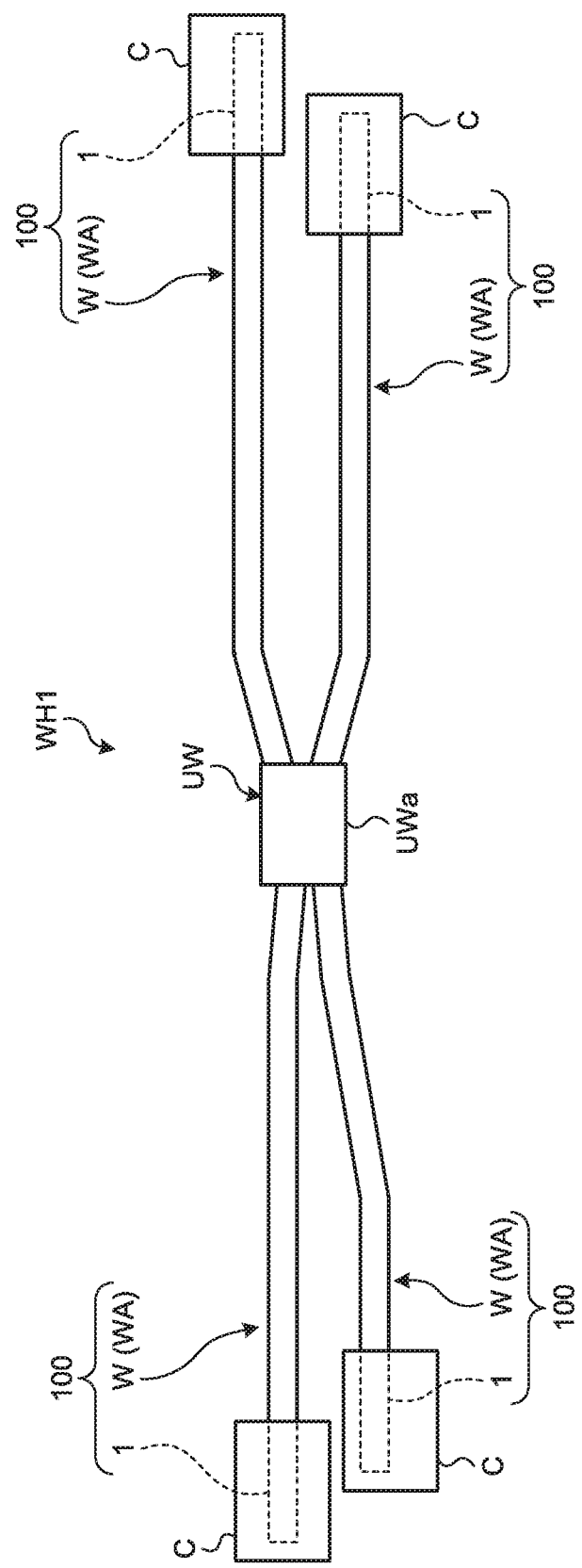
FIG. 3 is a schematic view illustrating a schematic configuration of a wire harness to which the terminal-attached electric wire according to the first embodiment is applied.
Figure 4:
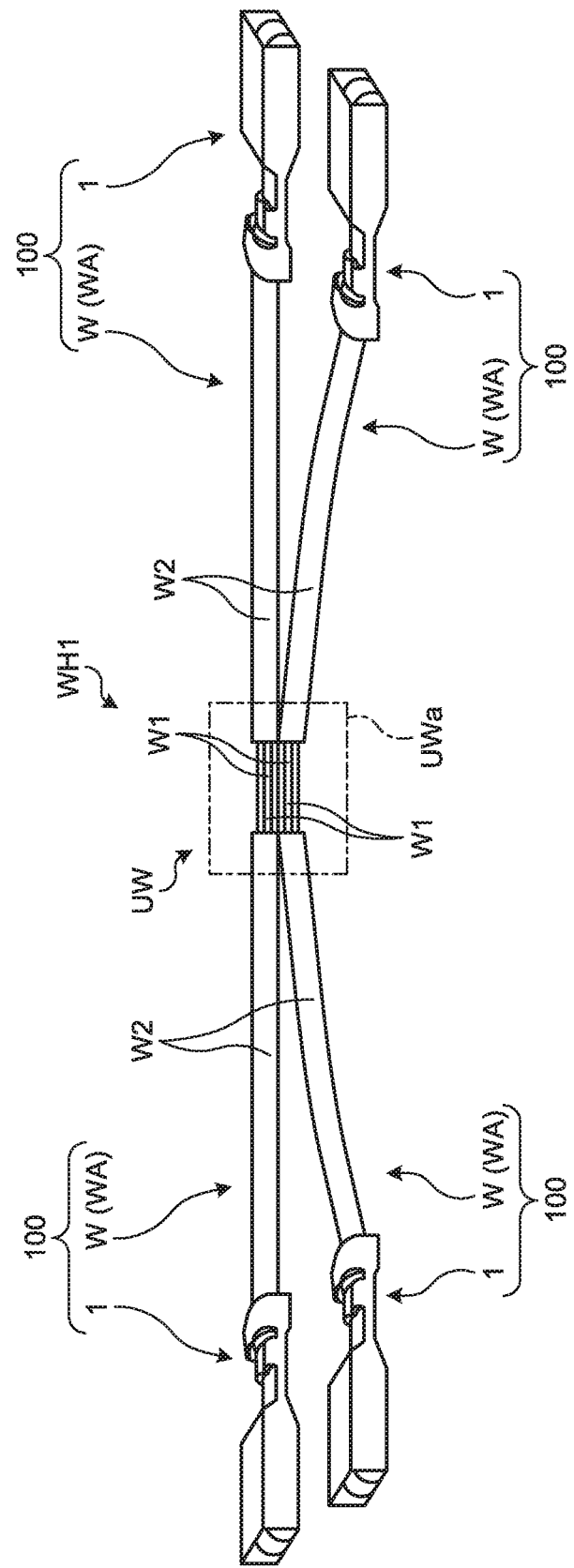
FIG. 4 is a schematic view illustrating the schematic configuration of the wire harness to which the terminal-attached electric wire according to the first embodiment is applied.

Here, referring to FIG. 3 and FIG. 4, a description is given of the wire harness WH1 to which the terminal-attached electric wire 100 is applied. For example, for connection between respective devices to be mounted on the vehicle, the wire harness WH1 is configured to form an assembled component (electric wire bundle) by bundling a plurality of the electric wires W for use in power supply and signal communication, and to connect the plurality of electric wires W to the respective devices by connectors C or the like. The wire harness WH1 includes: at least one terminal-attached electric wire 100; a connection counterpart electric wire WA to be connected to the electric wire W that constitutes the terminal-attached electric wire 100; and an ultrasonic bonding portion UW in which the electric wire W and the connection counterpart electric wire WA are subjected to ultrasonic bonding. The wire harness WH1 may be configured to further include, as well as the above, a variety of components such as exterior members, an electrical junction box, and a fixture, which include a corrugated tube, a grommet and the like.

The wire harness WH1 of this embodiment is an electric wire bundle provided with a plurality (here, four) of the terminal-attached electric wires 100, and respective electric wires W of the plurality of terminal-attached electric wires 100 are bonded to one another at the ultrasonic bonding portion UW. In this case, in each of the terminal-attached electric wires 100 in the wire harness WH1, the electric wire W of the other residual terminal-attached electric wire 100 will correspond to the connection counterpart electric wire WA. On both end portions of each of the electric wires W of this embodiment, the conductor portions W1 are exposed from the insulation coating portion W2. Then, in the respective electric wires W, the metal terminals 1 are provided on one-side end portions thereof, and the metal terminals 1 are individually held in the housings of the connectors C, and meanwhile, other-side end portions thereof are bonded to one another at the ultrasonic bonding portion UW.

The ultrasonic bonding portion UW is a portion in which the conductor portions W1 exposed from the insulation coating portions W2 are mutually subjected to the ultrasonic bonding in the respective electric wires W. In the ultrasonic bonding portion UW, such bonded portions of the respective conductor portions W1 are coated and protected with a protection member UWa having insulating properties. In other words, this ultrasonic bonding portion UW can also be said to be one that constitutes a branch connection portion in which the plurality of electric wires W are branched.

Figure 5:
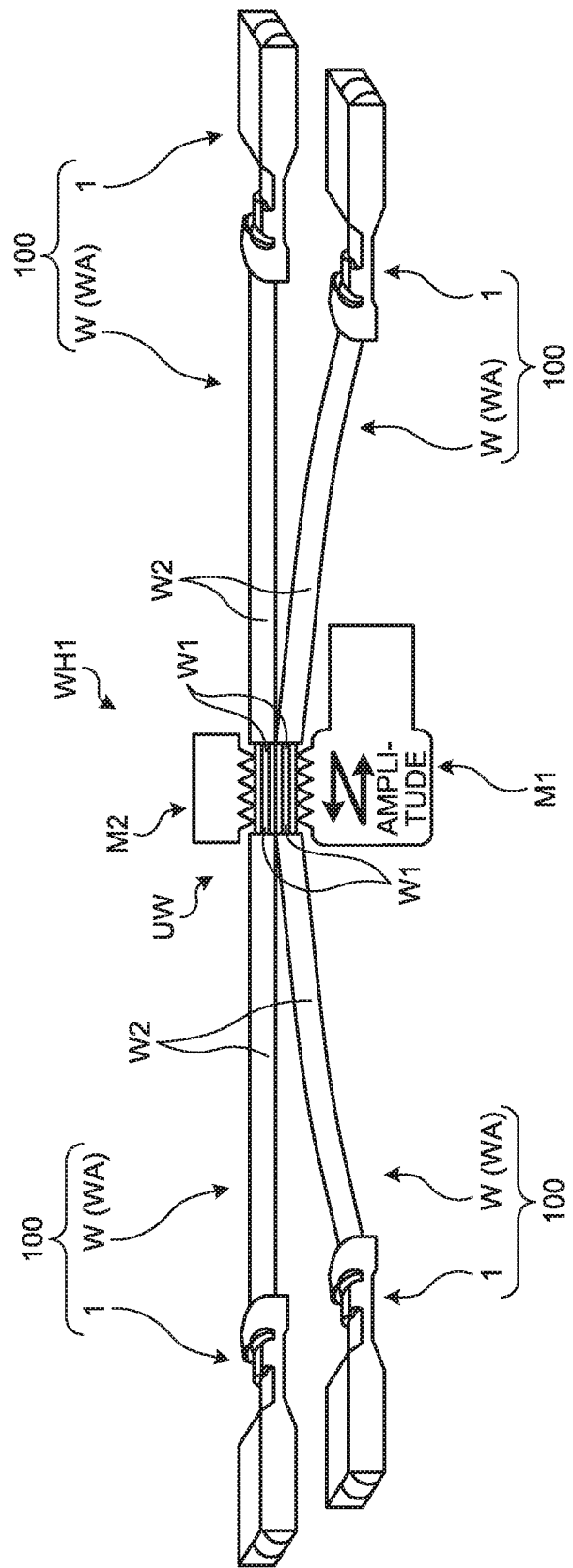
FIG. 5 is a schematic view explaining ultrasonic bonding in the wire harness to which the terminal-attached electric wire according to the first embodiment is applied.

Here, as illustrated in FIG. 5, the ultrasonic bonding is intermetallic bonding to be performed by using ultrasonic vibrations applied to connection targets by a horn M1 that constitutes a vibrator of an ultrasonic bonding machine. In this case, in a state in which the respective exposed conductor portions (core wires) W1 are stacked on one another, the plurality of electric wires W as the connection targets are clamped by an anvil M2 that constitutes a receiving jig and the horn M1, and the ultrasonic vibrations are applied to the conductor portions W1, which are stacked on one another, by the horn M1. As a result, typically, the plurality of electric wires W are bonded to one another in a solid state by plastic deformation in such a manner that bonded surfaces of the stacked conductor portions W1 rub against one another by the ultrasonic vibrations, and the ultrasonic bonding portion UW is formed.

In the wire harness WH1 configured as described above, when the ultrasonic vibrations are applied to the conductor portions W1 in a forming process of the ultrasonic bonding portion UW, the vibrations propagate through the electric wires W of the terminal-attached electric wire 100 and are applied to the metal terminals 1. In such a structure, the terminal-attached electric wire 100 of this embodiment ensures appropriate conduction performance by providing displacement regulating portions 25, which will be described later, for the metal terminals 1 to which the vibrations are applied as described above. Referring to FIG. 1 and FIG. 2 again, respective configurations of the metal terminal 1 will be described below in detail.

As illustrated in FIG. 1 and FIG. 2, the metal terminal 1 is a terminal fitting to which the electric wire W is electrically connected, and into and from which a counterpart terminal T having conductivity is inserted and removed. The metal terminal 1 of this embodiment is formed into a female terminal shape, and is electrically connected to the counterpart terminal T having a male terminal shape. The counterpart terminal T is formed into a substantially rectangular column shape in which a central axis line is along the axial direction X.

Specifically, the metal terminal 1 includes an electric wire connection portion 10, a box-shaped portion 20, and a spring contact portion 30. The electric wire connection portion 10, the box-shaped portion 20, and the spring contact portion 30 includes conductive metal in which an entirety is integrated, for example, copper, a copper alloy, aluminum, an aluminum alloy or the like. In the metal terminal 1, for example, a single metal plate punched into a shape corresponding to the respective portions such as the electric wire connection portion 10, the box-shaped portion 20, and the spring contact portion 30 is pressed and folded, whereby the respective portions are formed three-dimensionally and integrally. In the metal terminal 1, the electric wire connection portion 10 and the box-shaped portion 20 are coupled side by side to each other in this order from one side to other side along the axial direction X, and the spring contact portion 30 is provided in an inside of the box-shaped portion 20.

The electric wire connection portion 10 is a portion to which the electric wire W is connected and in which the conductor portion W1 on the terminal end of the electric wire W and the metal terminal 1 are electrically connected to each other. The electric wire connection portion 10 of this embodiment constitutes an electric wire crimp portion to be swaged and crimped to the electric wire W. The electric wire connection portion 10 is configured to include a conductor crimp portion 11, an intermediate portion 12, and a coating crimp portion 13. In the electric wire connection portion 10, the conductor crimp portion 11, the intermediate portion 12, and the coating crimp portion 13 are coupled side by side to one another in this order from the box-shaped portion 20 side toward an opposite side along the axial direction X.

The conductor crimp portion 11 is a portion that is provided on one end side in the axial direction X in the electric wire connection portion 10, here, on the box-shaped portion 20 side and is swaged and crimped to the conductor portion W1 of the electric wire W. More specifically speaking, the conductor crimp portion 11 is a portion that is electrically connected to the conductor portion W1 by being swaged and crimped to the conductor portion W1. By a base 14 and barrel piece (swaging pieces) portions 11a which extend in a band shape from the base 14 in the width direction Y, the conductor crimp portion 11 wraps an outside of the conductor portion W1 of the electric wire W and is swaged and crimped to the conductor portion W1. Though not shown, barrel piece portions 11a extend individually in the band shape from the base 14 to both sides in the width direction Y and are formed as a pair. Here, the base 14 extends along the axial direction X and constitutes a part of each of the conductor crimp portion 11, the intermediate portion 12, and the coating crimp portion 13. In the base 14, the box-shaped portion 20 is coupled to one side thereof in the axial direction K. In the metal terminal 1, the electric wire connection portion 10 and the box-shaped portion 20 are electrically connected to each other via the base 14, and the box-shaped portion 20 and the conductor portion W1 of the electric wire W are electrically connected and conducted with each other via the base 14.

The intermediate portion 12 is a portion that is interposed between the conductor crimp portion 11 and the coating crimp portion 13 and couples the conductor crimp portion 11 and the coating crimp portion 13 to each other.

The coating crimp portion 13 is a portion that is provided on other end side in the axial direction X in the electric wire connection portion 10, here, on the opposite side to the box-shaped portion 20 side and is swaged and crimped to the insulation coating portion W2 of the electric wire W. By the above-described base 14 and barrel piece (swaging pieces) portions 13a which extend in a band shape from the base 14 in the width direction Y, the coating crimp portion 13 wraps an outside of the insulation coating portion W2 of the electric wire W and is swaged and crimped to the insulation coating portion W2. Though not shown, the barrel piece portions 13a extend individually in the band shape from the base 14 to both sides in the width direction Y and are formed as a pair.

Note that the electric wire connection portion 10 of this embodiment constitutes a so-called separate barrel-type crimp portion in which the respective barrel portions 11a of the conductor crimp portion 11 and the respective barrel piece portions 13a of the coating crimp portion 13 are divided from each other in such a manner that the intermediate portion 12 is interposed between the respective barrel piece portions 11a and the respective barrel piece portions 13a. Moreover, for example, the electric wire connection portion 10 can be formed as one to be subjected to swage crimp that is so-called B crimp in which the pair of barrel piece portions 11a of the conductor crimp portion 11 do not overlap each other. However, the form of the electric wire connection portion 10 is not limited to these. The electric wire connection portion 10 may constitute a so-called integrated barrel-type crimp portion in which a pair of barrel piece portions continue to be integrated with each other along the axial direction X in the conductor crimp portion 11, the intermediate portion 12, and the coating crimp portion 13. Moreover, the electric wire connection portion 10 may be one in which the pair of barrel piece portions 11a overlap each other to be subjected to the swage crimp. Further, in the first place, the electric wire connection portion 10 does not need to be the electric wire crimp portion, and may be one that is electrically connected to the electric wire W in a form other than the crimp, for example, in a form of fusing, fastening or the like.

The box-shaped portion 20 is a portion to be electrically connected to the counterpart terminal T. The box-shaped portion 20 is formed into the female terminal shape as mentioned above, and is electrically connected to the counterpart terminal T formed into the male terminal shape. The box-shaped portion 20 of this embodiment is coupled to the electric wire connection portion 10 and formed into a box shape, and in a terminal insertion space portion 24 in an inside thereof, constitutes a portion into which the counterpart terminal T is insertable along the axial direction X.

The box-shaped portion 20 is formed into a tubular shape in which a central axis line goes along the axial direction X. The box-shaped portion 20 of this embodiment constitutes a hollow box portion formed into a substantially rectangular tube shape. The box-shaped portion 20 extends in the axial direction X, in which one side in the axial direction X is opened to form a terminal insertion port 24a, and the electric wire connection portion 10 is connected to other side. Then, a space portion in the inside of the box-shaped portion 20 constitutes the terminal insertion space portion 24. The terminal insertion space portion 24 is a space portion into and from which the counterpart terminal T formed into the substantially rectangular column shape is inserted and removed.

More specifically, the box-shaped portion 20 includes a bottom body 21 and a pair of wall bodies 22 and 23, and is formed into a box shape by these bottom body 21 and pair of wall bodies 22 and 23. The bottom body 21 and the pair of wall bodies 22 and 23 are integrated with one another to form such a substantially rectangular tube shape.

The bottom body 21 is formed into a substantially rectangular plate shape in which a plate thickness direction goes along the height direction Z, and extends along the axial direction X. In the bottom body 21, one end portion (end portion opposite to the terminal insertion port 24a side) thereof in the axial direction X is coupled to the base 14 of the electric wire connection portion 10.

The pair of wall bodies 22 and 23 are formed by protruding individually from both ends of the bottom body 21 in the width direction Y. More specifically, the pair of wall bodies 22 and 23 are formed by including side wall portions 22a and 23a and top surface portions 22b and 23b, respectively. The side wall portion 22a and the side wall portion 23a are portions which extend from the bottom body 21 along the height direction Z in the wall bodies 22 and 23, respectively. The side wall portion 22a and the side wall portion 23a are formed into a substantially rectangular plate shape in which a plate thickness direction goes along the width direction Y, and extend along the axial direction X. Then, the side wall portion 22a and the side wall portion 23a face each other at an interval with the terminal insertion space portion 24 interposed therebetween along the width direction Y. The top surface portion 22b and the top surface portion 23b are portions which extend from the side wall portions 22a and 23a of the wall bodies 22 and 23 along the width direction Y in the wall bodies 22 and 23, respectively. Like the above-mentioned bottom body 21, the top surface portions 22b and 23b are formed into a substantially rectangular plate shape in which a plate thickness direction goes along the height direction Z, and extend along the axial direction X. Then, the top surface portions 22b and 23b and the above-mentioned bottom body 21 face each other at an interval with the terminal insertion space portion 24 interposed therebetween along the height direction Z. Here, the top surface portion 22b and the top surface portion 23b overlap each other along the height direction Z such that, between a pair of the top surface portions 22b and 23b, the top surface portion 22b is located inside (terminal insertion space portion 24 side), and the top surface portion 23b is located outside (opposite side to the terminal insertion space portion 24 side).

The terminal insertion space portion 24 is partitioned by the bottom body 21 and the pair of wall bodies 22 and 23, which are mentioned as above. That is, in the terminal insertion space portion 24, the height direction Z is partitioned by the bottom body 21 and the top surface portions 22b and 23b of a wall body 22, and the width direction Y is partitioned by the side wall portion 22a of the wall body 22 and the side wall portion 23a of a wall body 23. Thus, the terminal insertion space portion 24 is formed by extending along the axial direction X in the inside of the box-shaped portion 20. Then, in the box-shaped portion 20, the terminal insertion port 24a for the terminal insertion space portion 24 is formed of one end portions (end portions opposite to the electric wire connection portion 10 side) of the bottom body 21, the side wall portions 22a and 23a and the top surface portion 22b in the axial direction X. In the box-shaped portion 20, the counterpart terminal T is inserted into the terminal insertion space portion 24 along the axial direction X via the terminal insertion port 24a formed on the one end portions in the axial direction X.

The spring contact portion 30 is a portion that is located inside the terminal insertion space portion 24, is elastically deformably supported in the box-shaped portion 20 in a cantilever manner, and forms a contact with the counterpart terminal T. The spring contact portion 30 is formed into a substantially rectangular plate shape in which a plate thickness direction goes along the height direction Z, and extends along the axial direction X. The spring contact portion 30 is located so as to face the bottom body 21 on one side thereof in the height direction Z, and to face to the top surface portions 22b and 23b on other side thereof in the height direction Z. Then, in the spring contact portion 30, an end portion thereof on the terminal insertion port 24a side in the axial direction X is coupled to and supported by the bottom body 21. That is, in the spring contact portion 30, a base end portion thereof that is an end portion on the terminal insertion port 24a side in the axial direction X is coupled to and supported by the bottom body 21, and a tip end portion thereof that is an opposite end portion to the terminal insertion port 24a side in the axial direction X becomes a free end. Here, in the spring contact portion 30, the end portion thereof on the terminal insertion port 24a side in the axial direction X is continuously folded back from the bottom body 21, whereby the base end portion to be supported by the bottom body 21 is provided. Thus, the spring contact portion 30 of this embodiment is supported by the bottom body 21 in a cantilever manner so as to be elastically deformable with respect to the height direction Z. Note that, in the spring contact portion 30, a contact forming portion 30a is formed in such a manner that a middle portion thereof in the axial direction X is bent so as to protrude to the top surface portion 22b side. The contact forming portion 30a is a main portion that contacts the counterpart terminal T inserted into the terminal insertion space portion 24, forms a contact with the counterpart terminal T, and is conducted therewith.

In the metal terminal 1 configured as described above, the counterpart terminal T is inserted into the terminal insertion space portion 24 via the terminal insertion port 24a along the axial direction X. At this time, in the metal terminal 1, the counterpart terminal T is inserted into the terminal insertion space portion 21 while bending the spring contact portion 30 to the bottom body 21 side. Then, in the metal terminal 1, the spring contact portion 30 contacts the counterpart terminal T via the contact forming portion 30a and the like, is pressed against the counterpart terminal T side by an elastic resilient force of its own, and forms the contact with the counterpart terminal T. As a result, the metal terminal 1 is conducted with the counterpart terminal T via the contact forming portion 30a and the like, and can conduct and connect the electric wire W and the counterpart terminal T with each other.

Then, the box-shaped portion 20 includes the displacement regulating portion 25, whereby the metal terminal 1 of this embodiment, which is configured as described above, achieves a configuration that accomplishes appropriate conduction performance. The displacement regulating portion 25 is a portion that is provided in the box-shaped portion 20, and regulates a relative displacement between the pair of wall bodies 22 and 23.

Specifically, the displacement regulating portion 25 of this embodiment is configured to include a clamping portion 26. The clamping portion 26 is provided on one of the top surface portions 22b and 23b which make a pair, and is formed as a portion that clamps the other of the top surface portions 22b and 23b which make a pair. The clamping portion 26 of this embodiment is provided on the top surface portion 23b located outside in the height direction Z, and clamps the top surface portion 22b located inside in the height direction Z. Here, the clamping portion 26 is a clip-shaped folded piece formed in such a manner that, in the top surface portion 23b, the end portion thereof on the terminal insertion port 24a side in the axial direction X is folded back to the inside along the height direction Z, that is, to the top surface portion 22b side. The clamping portion 26 is formed so as to be continuously folded back from the end portion of the top surface portion 23b on the terminal insertion port 24a side in the axial direction X, to face the top surface portion 23b with respect to the height direction Z, and to clamp the top surface portion 22b with the top surface portion 23b. That is, in the box-shaped portion 20, on an end portion thereof on the terminal insertion port 24a side in the axial direction X, the clamping portion 26, the top surface portion 22b, and the top surface portion 23b are located so as to overlap one another in order from the inside toward the outside with respect to the height direction Z, and the top surface portion 22b is clamped between the clamping portion 26 and the top surface portion 23b. The clamping portion 26 is molded, for example, at the time of molding the respective portions of the metal terminal 1 by pressing, folding and the like. By clamping the top surface portion 22b with the top surface portion 23b by the clamping portion 26, the displacement regulating portion 25 of this embodiment regulates a relative displacement between the top surface portion 22b and the top surface portion 23b, and as a result, regulates a relative displacement between the wall body 22 and the wall body 23.

In the terminal-attached electric wire 100 and the wire harness WH1, which are described above, the counterpart terminal T is inserted into the terminal insertion space portion 24 of the box-shaped portion 20 coupled to the electric wire connection portion 10. Then, in the metal terminal 1, the contact is formed of the spring contact portion 30, which is supported in the terminal insertion space portion 24, with the counterpart terminal T. In such a configuration, the metal terminal 1 includes the displacement regulating portion 25 that regulates the relative displacement between the pair of wall bodies 22 and 23 among the bottom body 21 and the pair of wall bodies 22 and 23, which constitute the box-shaped portion 20. With this configuration, for example, the metal terminal 1 regulates the relative displacement between the pair of wall bodies 22 and 23 by the displacement regulating portion 25, thus making it possible to suppress deformation of the box-shaped portion 20 itself and the spring contact portion 30 elastically deformably supported on the box-shaped portion 20. As a result, for example, even if the vibrations propagate through the electric wire W and transmit through the metal terminal 1 in the forming process of the ultrasonic bonding portion UW, the metal terminal 1 can suppress the box-shaped portion 20 itself and the spring contact portion 30 elastically deformably supported on the box-shaped portion 20 from being deformed by the vibrations, and can improve resistance thereof to the vibrations. Thus, for example, the metal terminal 1 can suppress the relative displacement between the box-shaped portion 20 and the spring contact portion 30, which follows the vibrations, and can suppress the spring contact portion 30 from being elastically deformed excessively and a large stress from acting on the base end portion of the spring contact portion 30. Hence, even if the ultrasonic, vibrations are transmitted to the metal terminal 1, the metal terminal 1 can appropriately maintain the configuration capable of forming the contact with the counterpart terminal T via the spring contact portion 30 and conducting and connecting thereto. As a result, the terminal-attached electric wire 100 and the wire harness WH1 can ensure the appropriate conduction performance, and can suppress connection reliability from being reduced.

Here, the terminal-attached electric wire 100 and the wire harness WH1, which are described above, are configured in such a manner that the displacement regulating portion 25 includes the clamping portion 26. With this configuration, the metal terminal 1 clamps the top surface portion 22b with the top surface portion 23b by the clamping portion 26, can thereby regulate the relative displacement between the top surface portion 22b and the top surface portion 23b, and as a result, can regulate the relative displacement between the pair of wall bodies 22 and 23 by the displacement regulating portion 25. Hence, the terminal-attached electric wire 100 and the wire harness WH1 can ensure the appropriate conduction performance as mentioned above.

Note that, in the above description, the clamping portion 26 is described to be one that is provided on the top surface portion 23b located outside in the height direction Z and to clamp the top surface portion 22b located inside in the height direction Z, but is not limited to this. The clamping portion 26 may be formed so as to be provided on the top surface portion 22b located inside in the height direction Z, and to clamp the top surface portion 23b located outside in the height direction Z. Even in this case, the terminal-attached electric wire 100 and the wire harness WH1 can regulate the relative displacement between the pair of wall bodies 22 by the clamping portion 26 that constitutes the displacement regulating portion 25, and can ensure the appropriate conduction performance.

Figure 6:
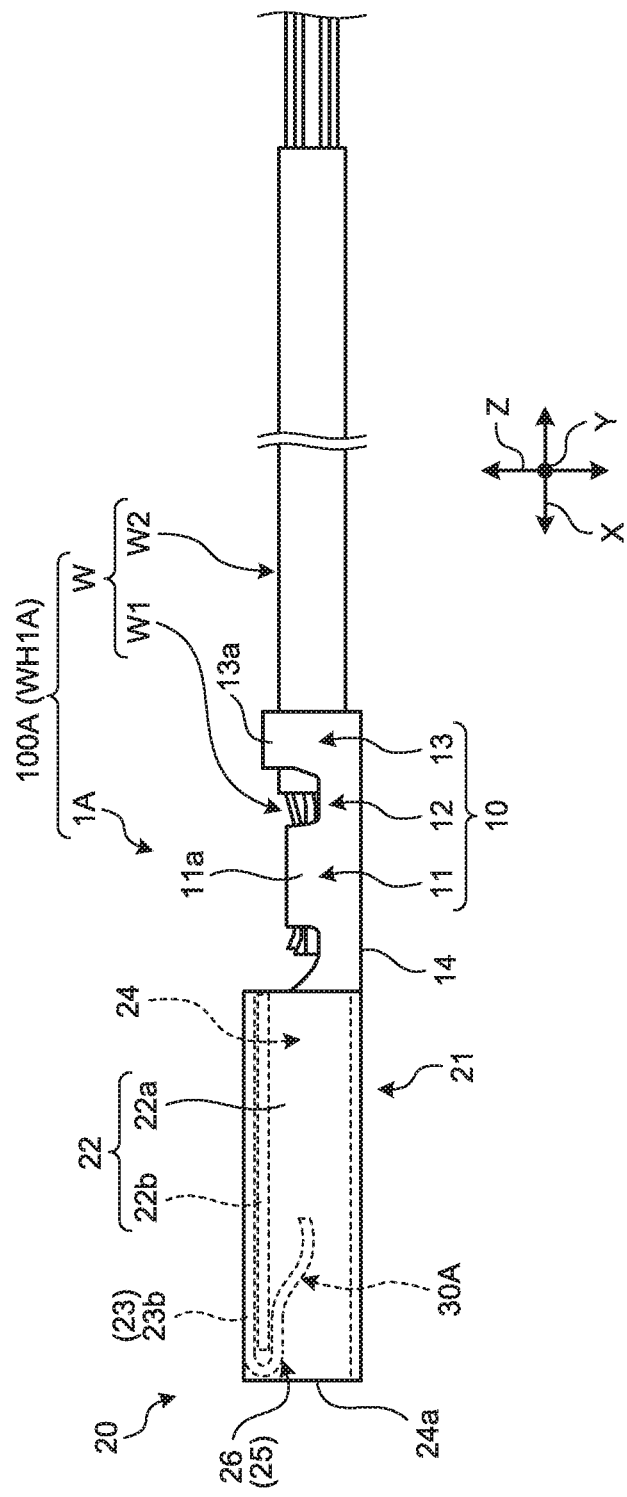
FIG. 6 is a schematic side view illustrating a schematic configuration of a terminal-attached electric wire according to a modified example.
Figure 7:
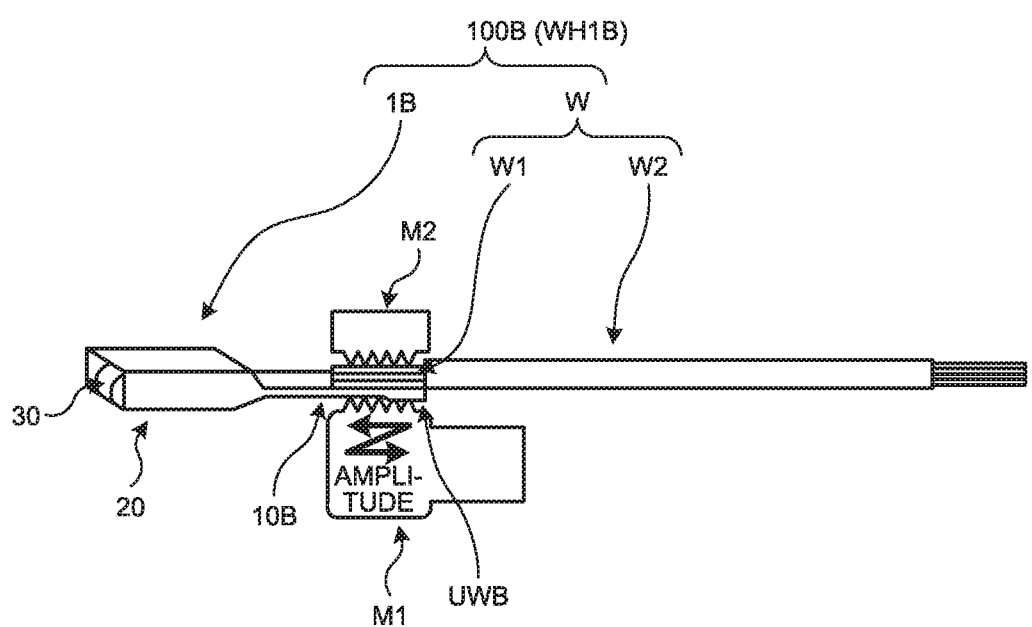
FIG. 7 is a schematic view illustrating a schematic configuration of a terminal-attached electric wire according to a modified example.

Moreover, in the above description, the box-shaped portion 20 is described to be one in which the spring contact portion 30 is supported on the bottom body 21, but is not limited to this. For example, a wire harness WH1A according to a modified example illustrated in FIG. 6 includes a terminal-attached electric wire 100A, and the terminal-attached electric wire 10A includes a metal terminal 1A. The wire harness WH1A, the terminal-attached electric wire 100A and the metal terminal 1A are different from the wire harness WH1, the terminal-attached electric wire 100 and the metal terminal 1, which are mentioned above, in that a spring contact portion 30A is provided in place of the spring contact portion 30. Other configurations of the wire harness WH1A, the terminal-attached electric wire 100A and the metal terminal 1A are substantially similar configurations to those of the wire harness WH1, the terminal-attached electric wire 100 and the metal terminal 1, which are mentioned above. The spring contact portion 30A of this modified example is supported on the top surface portion 22b and 23b side, more specifically, on an end portion of the clamping portion 26. In other words, here, the spring contact portion 30A is formed integrally with the clamping portion 26. In the spring contact portion 30A, an end portion thereof on the terminal insertion port 24a side in the axial direction is supported on an end portion of the clamping portion 26 on the electric wire connection portion 10 side in the axial direction X, the clamping portion 26 being folded back from the top surface portion 23b. That is, in the spring contact portion 30A, a base end portion thereof that is the end portion on the terminal insertion port 24a side in the axial direction X is coupled to and supported by the clamping portion 26, and a tip end portion thereof that is an opposite end portion to the terminal insertion port 24a side in the axial direction X becomes a free end. Thus, the spring contact portion 30 of this embodiment is supported by the clamping portion 26 in a cantilever manner so as to be elastically deformable with respect to the height direction Z. Even in this case, like the above, the terminal-attached electric wire 100A and the wire harness WH1A can ensure the appropriate conduction performance by the fact that the displacement regulating portion 25 is provided in the box-shaped portion 20.

Moreover, in the above description, the electric wire connection portion 10 is described to be one that constitutes the electric wire crimp portion, but is not limited to this, and may be one that is electrically connected to the electric wire W in a form other than the crimp, for example, in a form of fusing, fastening or the like. For example, a wire harness WH1B according to a modified example illustrated in FIG. 8 includes a terminal-attached electric wire 100B, and the terminal-attached electric wire 100B includes a metal terminal 1B. The wire harness WH1B, the terminal-attached electric wire 100B and the metal terminal 1B are different from the wire harness WH1, the terminal-attached electric wire 100 and the metal terminal 1, which are mentioned above, in that an electric wire connection portion 10B is provided in place of the electric wire connection portion 10. Other configurations of the wire harness WH1B, the terminal-attached electric wire 100B and the metal terminal 1B are substantially similar configurations to those of the wire harness WH1, the terminal-attached electric wire 100 and the metal terminal 1, which are mentioned above. The electric wire connection portion 10B of this modified example is formed into a substantially rectangular plate shape in which a plate thickness direction goes along the height direction Z. Here, the bottom body 21 (see FIG. 1 and the like) of the box-shaped portion 20 is coupled to the electric wire connection portion 10B formed into the plate shape. Then, the electric wire connection portion 10B is subjected to ultrasonic bonding to the conductor portion W1 of the electric wire W, which is exposed from the insulation coating portion W2, and thereby forms an ultrasonic bonding portion UWB. That is, tis terminal-attached electric wire 100B includes the ultrasonic bonding portion UWB also in the terminal-attached electric wire 100B itself. The ultrasonic bonding portion UWB here is a portion in which the electric wire connection portion 10B of the metal terminal 1B and the conductor portion W1 of the electric wire W are subjected to the ultrasonic bonding in the terminal-attached electric wire 100B. As in an example of FIG. 5, in the terminal-attached electric wire 100B, in a state in which the electric wire connection portion 10B and the conductor portion W1 are stacked on each other, the electric wire connection portion 10B and the conductor portion W1 are clamped by the anvil M2 and the horn M1, and the ultrasonic vibrations are applied to such a stacked portion by the horn M1. As a result, in the terminal-attached electric wire 100B, typically, bonded surfaces of the stacked electric wire connection portion 10B and conductor portion W1 rub against each other by the ultrasonic vibrations, and are thereby bonded to each other in a solid state by plastic deformation, and the ultrasonic bonding portion UWB is formed. Thus, the terminal-attached electric wire 100B can conduct and connect the electric wire W to the electric wire connection portion 10B. Then, even if the ultrasonic bonding portion UWB is formed in the terminal-attached electric wire 100B itself, like the above, the terminal-attached electric wire 100B and the wire harness WH1B can ensure the appropriate conduction performance by the fact that the displacement regulating portion 25 is provided in the box-shaped portion 20.

Second Embodiment

A terminal-attached electric wire and a wire harness according to a second embodiment are different from those of the first embodiment in configuration of the displacement regulating portion. Hereinafter, common reference numerals will be assigned to similar constituents to those of the above-mentioned embodiment, and duplicate descriptions of common configurations, functions and effects will be omitted as much as possible (the same will apply hereinafter).

Figure 8:
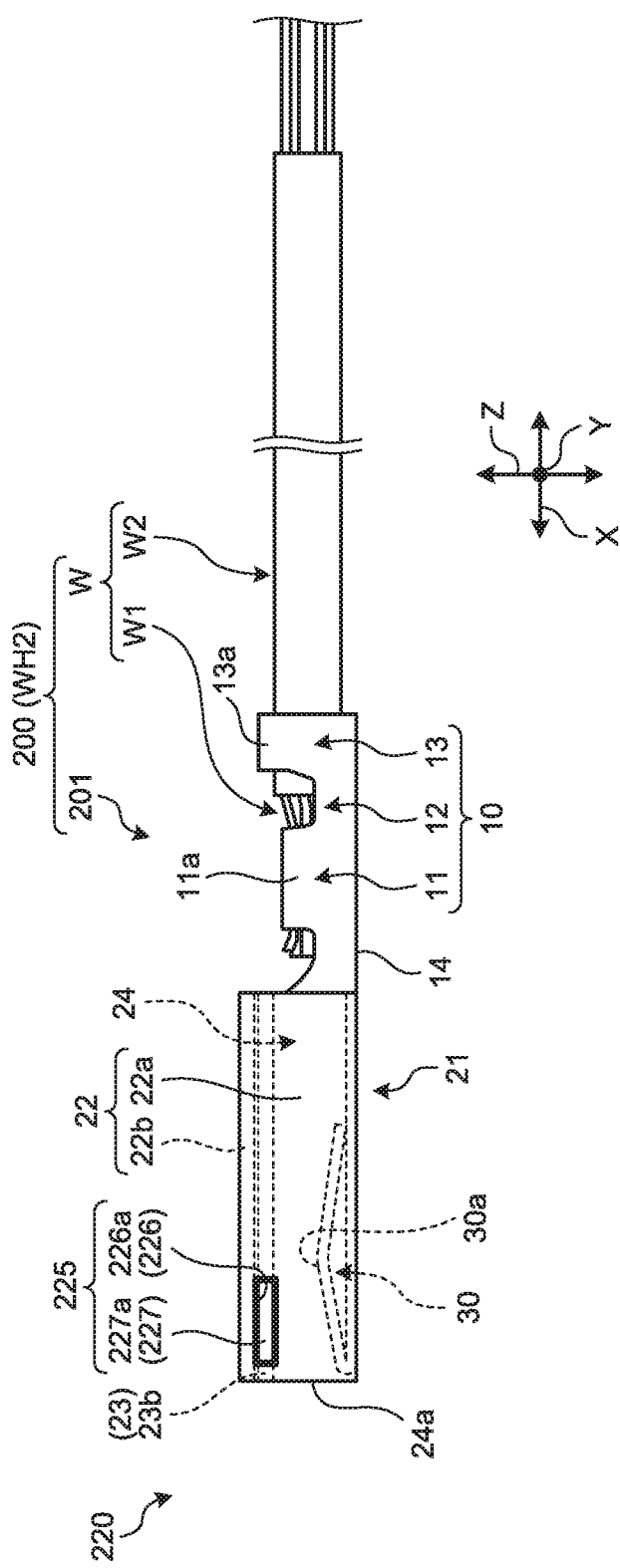
FIG. 8 is a schematic side view illustrating a schematic configuration of a terminal-attached electric wire according to a second embodiment.
Figure 9:
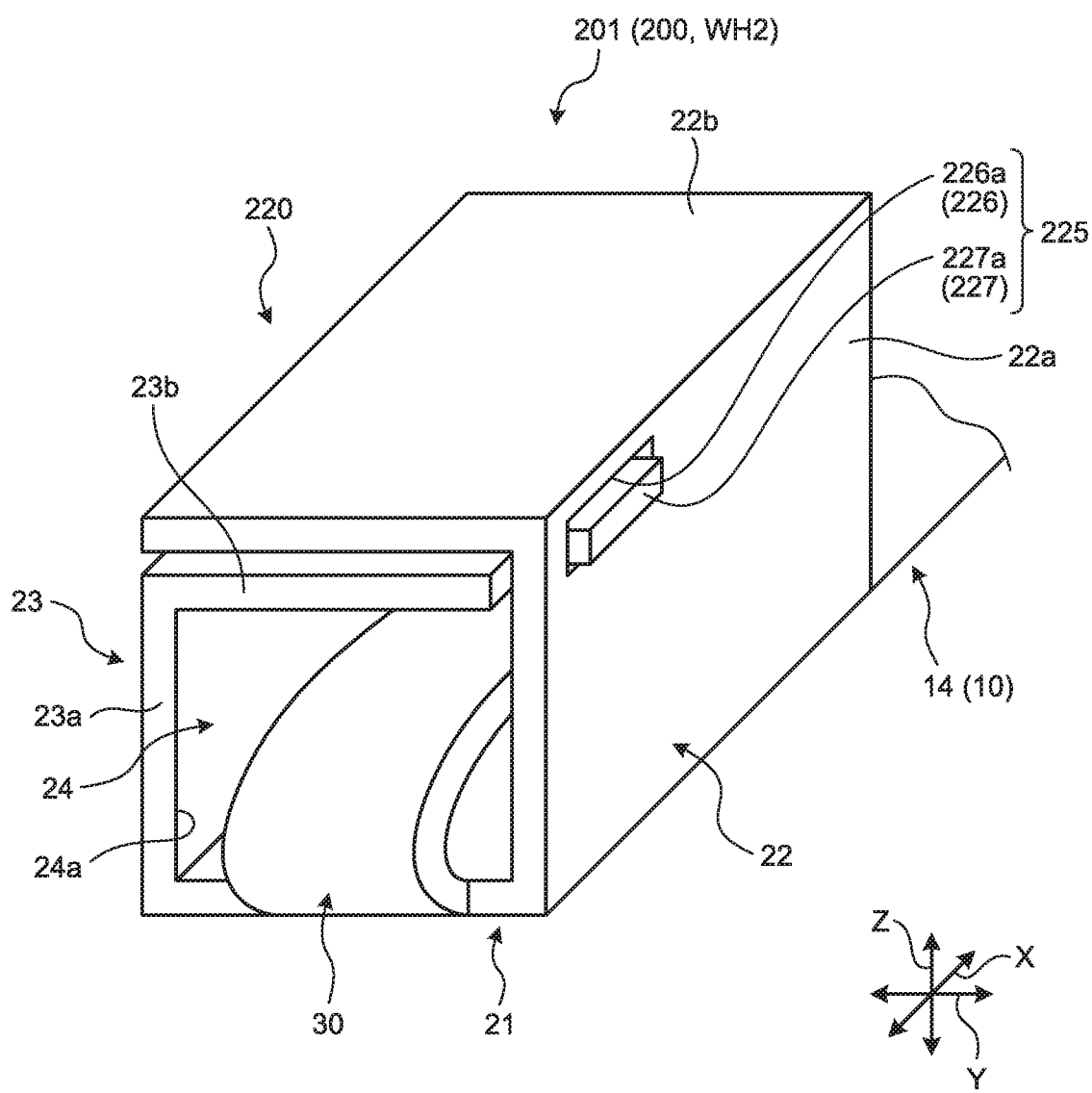
FIG. 9 is a schematic perspective view illustrating the schematic configuration of the terminal-attached electric wire according to the second embodiment.

A wire harness WH2 of this embodiment, which is illustrated in FIG. 8 and FIG. 9, includes a terminal-attached electric wire 200, and the terminal-attached electric wire 200 includes a metal terminal 201. The wire harness WH2, the terminal-attached electric wire 200 and the metal terminal 201 are different from the wire harness WH1, the terminal-attached electric wire 100 and the metal terminal 1, which are mentioned above, in including a box-shaped portion 220 in place of the box-shaped portion 20, and in including a displacement regulating portion 225 in place of the displacement regulating portion 25. Other configurations of the wire harness WH2, the terminal-attached electric wire 200 and the metal terminal 201 are substantially similar configurations to those of the wire harness W1, the terminal-attached electric wire 100 and the metal terminal 1, which are mentioned above.

The box-shaped portion 220 of this embodiment is different from the above-mentioned box-shaped portion 20 in that, between the pair of top surface portions 22b and 23b, the top surface portion 23b is located inside (terminal insertion space portion 24 side), and the top surface portion 22b is located outside (opposite side to the terminal insertion space portion 24 side). Other configurations of the box-shaped portion 220 are substantially similar configurations to those of the above-mentioned box-shaped portion 20.

Then, the displacement regulating portion 225 of this embodiment is different from the above-mentioned displacement regulating portion 25 in being configured to include a recess 226 and a protrusion 227 in place of the clamping portion 26. The displacement regulating portion 225 of this embodiment is a portion that is configured to include the recess 226 and the protrusion 227 and regulates the relative displacement between the pair of wall bodies 22 and 23 by these.

The recess 226 is provided in one of the wall bodies 22 and 23 which make a pair. The protrusion 227 is provided is the other of the wall bodies 22 and 23 which make a pair and is fitted to the recess 226. The recess 226 of this embodiment is provided in the wall body 22 between the pair of wall bodies 22 and 23, and the protrusion 227 of this embodiment is provided in the wall body 23 between the pair of wall bodies 22 and 23.

More specifically, the recess 226 is formed into a recessed shape in the side wall portion 22a of the wall body 22. The recess 226 of this embodiment is formed as a through hole 226a that penetrates the side wall portion 22a along the width direction Y. Here, in the through hole 226a that constitutes the recess 226, a cross-sectional shape thereof perpendicular to the width direction Y is formed into a substantially rectangular shape. The through hole 226a is formed in an end portion on the top surface portion 22b side in the height direction Z in the side wall portion 22a.

Meanwhile, the protrusion 227 is formed into a protrusion shape in the top surface portion 23b of the wall body 23. The protrusion 227 of this embodiment is formed as a protruding piece 227a that protrudes along the width direction Y from an end surface on the side wall portion 22a side in the width direction Y in the top surface portion 23b. Here, in the protruding piece 227a that constitutes the protrusion 227, a cross-sectional shape thereof perpendicular to the width direction Y is formed into a substantially rectangular shape. The protruding piece 227a is formed at a position and size of being fitted (inserted) to and penetrating the through hole 226a, which constitutes the recess 226, along the width direction Y in a state in which the bottom body 21 and the pair of wall bodies 22 and 23 form such a box shape.

For example, the recess 226 and the protrusion 227 are molded at the time of molding the respective portions of the metal terminal 201 by pressing, folding and the like, and the protrusion 227 is set to a state of being fitted to the recess 226. By the fact that the protrusion 227 is set to the state of being fitted to the recess 226, the displacement regulating portion 225 of this embodiment regulates a relative displacement between the side wall portion 22a and the top surface portion 23b, and as a result, regulates the relative displacement between the wall body 22 and the wall body 23.

The terminal-attached electric wire 200 and the wire harness WH2, which are described above, regulate the relative displacement between the pair of wall bodies 22 and 23 by the displacement regulating portion 225, thus making it possible to suppress deformation of the box-shaped portion 220 itself and the spring contact portion 30 elastically deformably supported on the box-shaped portion 220. As a result, the terminal-attached electric wire 200 and the wire harness WH2 can ensure the appropriate conduction performance.

Here, the terminal-attached electric wire 200 and the wire harness WH2, which are described above, are configured to include the recess 226 formed in the side wall portion 22a and the protrusion 227 formed in the top surface portion 23b. With this configuration, the protrusion 227 is set to the state of being fitted to the recess 226, whereby the metal terminal 201 can regulate the relative displacement between the side wall portion 22a and the top surface port iron 23b, and as a result, can regulate the relative displacement between the pair of wall bodies 22 and 23 by the displacement regulating portion 225. Hence, the terminal-attached electric wire 200 and the wire harness WH2 can ensure the appropriate conduction performance as mentioned above.

Note that, in the above description, the recess 226 is described to be one provided in the wall body 22 between the pair of wall bodies 22 and 23, and the protrusion 227 is described to be one provided in the wall body 23 between the pair of wall bodies 22 and 23, but are not limited to this. The recess 226 may be provided on the wall body 23 side, and the protrusion 227 may be provided on the wall body 22 side.

Third Embodiment

A terminal-attached electric wire and a wire harness according to a third embodiment are different from those of the second embodiment in positional relationship between the recess and the protrusion which constitute the displacement regulating portion, and the like. Note that FIG. 10 to be described below illustrates a box-shaped portion as a schematic cross section. Moreover, FIG. 12 illustrates a cross-sectional view along a line A-A illustrated in FIG. 10.

Figure 10:
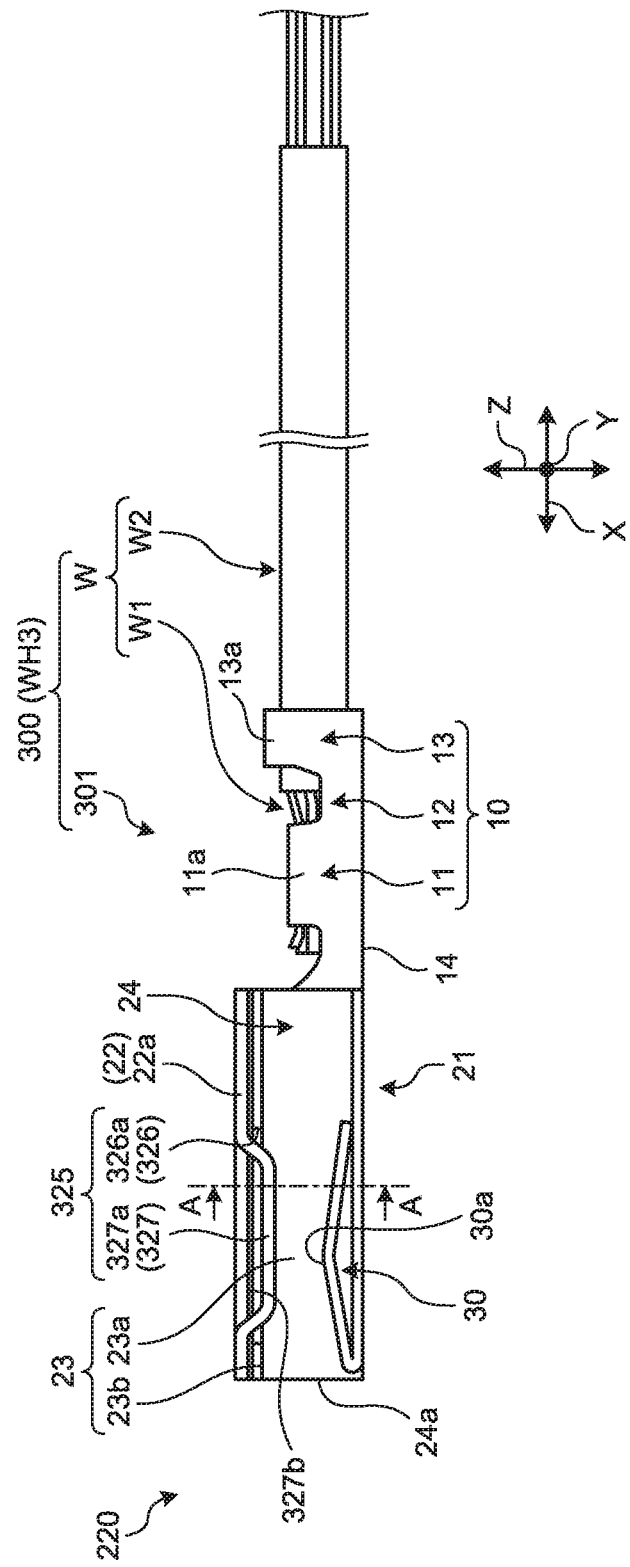
FIG. 10 is a schematic cross-sectional view illustrating a schematic configuration of a terminal-attached electric wire according to a third embodiment.
Figure 11:
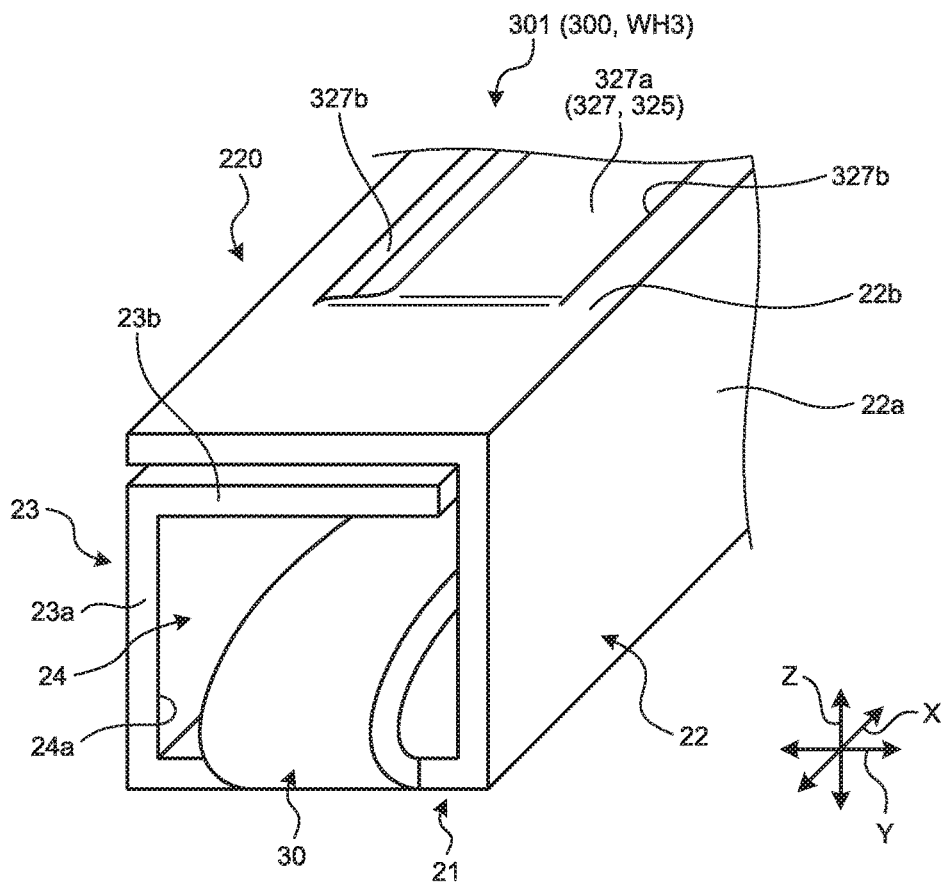
FIG. 11 is a schematic perspective view illustrating the schematic configuration of the terminal-attached electric wire according to the third embodiment.
Figure 12:
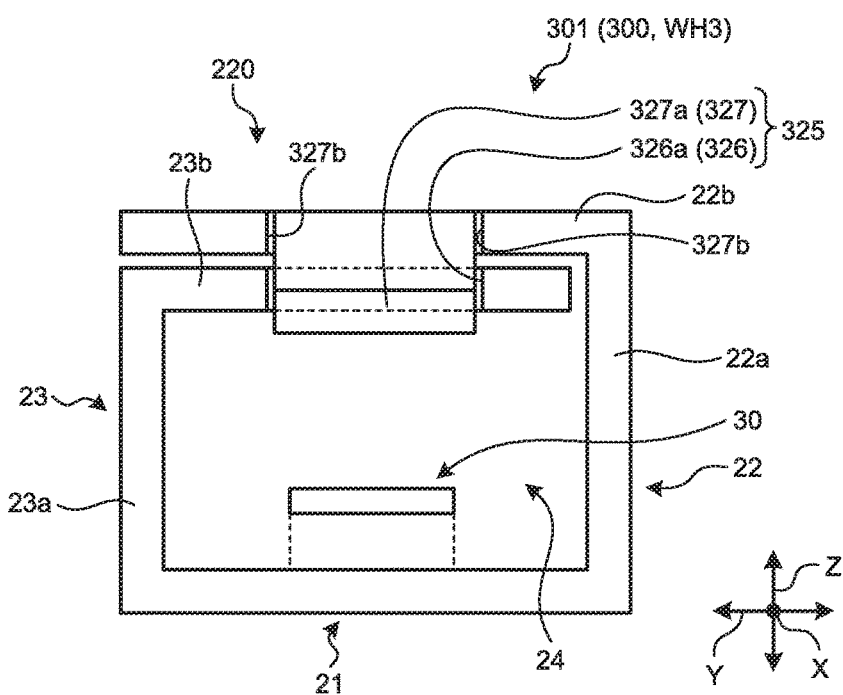
FIG. 12 is a schematic cross-sectional view illustrating the schematic configuration of the terminal-attached electric wire according to the third embodiment.

A wire harness WH3 of this embodiment, which is illustrated in FIG. 10, FIG. 11 and FIG. 12, includes a terminal-attached electric wire 300, and the terminal-attached electric wire 300 includes a metal terminal 301. The wire harness WH3, the terminal-attached electric wire 300 and the metal terminal 301 are different from the wire harness WH2, the terminal-attached electric wire 200 and the metal terminal 201, which are mentioned above, in including a displacement regulating portion 325 in place of the displacement regulating portion 225. Other configurations of the wire harness WH3, the terminal-attached electric wire 300 and the metal terminal 301 are substantially similar configurations to those of the wire harness WH2, the terminal-attached electric wire 200 and the metal terminal 201, which are mentioned above.

The displacement regulating portion 325 of this embodiment is different from the above-mentioned displacement regulating portion 225 in being configured to include a recess 326 and a protrusion 327 in place of the recess 226 and the protrusion 227. The displacement regulating portion 325 of this embodiment is a portion that is configured to include the recess 326 and the protrusion 327 and regulates the relative displacement between the pair of wall bodies 22 and 23 by these.

The recess 326 is provided in one of the wall bodies 22 and 23 which make a pair. The protrusion 327 is provided in the other of the wall bodies 22 and 23 which make a pair and is fitted to the recess 326. The recess 326 of this embodiment is provided in the wall body 23 between the pair of wall bodies 22 and 23, and the protrusion 327 of this embodiment is provided in the wall body 22 between the pair of wall bodies 22 and 23.

More specifcally, the recess 326 is formed into a recessed shape in the top surface portion 23b of the wall body 23. That is, the recess 326 is provided in the top surface portion 23b, which is located on the terminal insertion space portion 24 side (inside in the height direction Z), between the pair of top surface portions 22b and 23b. The recess 326 of this embodiment is formed as a through hole 326a that penetrates the top surface portion 23b along the height direction Z. Here, in the through hole 326a that constitutes the recess 326, a cross-sectional shape thereof perpendicular to the height direction Z is formed into a substantially rectangular shape. The through hole 326a is formed by extending along the axial direction X in a substantially central portion in the axial direction X and the width direction Y in the top surface portion 23b.

Meanwhile, the protrusion 327 is formed into a protrusion shape in the top surface portion 22b of the wall body 22. That is, the protrusion 327 is provided in the top surface portion 22b, which is located on an opposite side (outside in the height direction Z) to the terminal insertion space portion 24 side between the pair of top surface portions 22b and 23b. In the top surface portion 22b, the protrusion 327 of this embodiment is formed as a bead portion 327a in which a substantially central portion in the axial direction X and the width direction Y is extruded along the height direction Z to the terminal insertion space portion 24 side (inside). Here, the bead portion 327a that constitutes the protrusion 327 is formed such that a portion sandwiched by a pair of cut lines 327b formed on the top surface portion 22b is extruded to the terminal insertion space portion 24 side (inside). In the top surface portion 22b, the pair of cut lines 327b are formed at an interval along the width direction Y and in parallel to each other along the axial direction X. The bead portion 327a is formed by extending along the axial direction X. The bead portion 327a is formed at a position and size of being fitted (inserted) to and penetrating the through hole 326a, which constitutes the recess 326, along the height direction Z in a state in which the bottom body 21 and the pair of wall bodies 22 and 23 form such a box shape.

For example, the recess 326 and the protrusion 327 are molded at the time of molding the respective portions of the metal terminal 301 by pressing, folding and the like, and the protrusion 327 is set to a state of being fitted to the recess 326. By the fact that the protrusion 327 is set to the state of being fitted to the recess 326, the displacement regulating portion 325 of this embodiment regulates a relative displacement between the top surface portion 22b and the top surface portion 23b, and as a result, regulates the relative displacement between the wall body 22 and the wall body 23.

The terminal-attached electric wire 300 and the wire harness WH3, which are described above, regulate the relative displacement between the pair of wall bodies 22 and 23 by the displacement regulating portion 325, thus making it possible to suppress the deformation of the box-shaped portion 220 itself and the spring contact portion 30 elastically deformably supported on the box-shaped portion 220. As a result, the terminal-attached electric wire 300 and the wire harness WH3 can ensure the appropriate conduction performance.

Here, the terminal-attached electric wire 300 and the wire harness WH3, which are described above, are configured to include the recess 326 formed in the top surface portion 23b and the protrusion 327 formed in the top surface portion 22b. With this configuration, the protrusion 327 is set to the state of being fitted to the recess 326, whereby the metal terminal 301 can regulate the relative displacement between the top surface portion 22b and the top surface portion 23b, and as a result, can regulate the relative displacement between the pair of wall bodies 22 and 23 by the displacement regulating portion 325. Here, the bead portion 327a that constitutes the protrusion 327 is fitted to the through hole 326a that constitutes the recess 326, and individual end surfaces thereof abut against each other, whereby the metal terminal 301 can surely regulate the pair of wall bodies 22 and 23 from being displaced so as to open to both sides in the width direction Y. Hence, the terminal-attached electric wire 300 and the wire harness WH3 can ensure the appropriate conduction performance as mentioned above.

Further here, by synergy between such a configuration in which the bead portion 327a is provided in the top surface portion 22b and such a configuration in which the spring contact portion 30 is provided on the bottom body 21, the terminal-attached electric wire 300 and the wire harness WH3, which are described above, can improve a force to hold the counterpart terminal T, which is inserted into the terminal insertion space portion 24, by the resilient force of the spring contact portion 30. That is, the terminal-attached electric wire 300 and the wire harness WH3 can combine such a configuration for suppressing the deformation of the box-shaped portion 220 and the like and ensuring the appropriate conduction performance and such a configuration for improving the holding force of the counterpart terminal T with each other, and accordingly, can effectively use the space.

Figure 13:
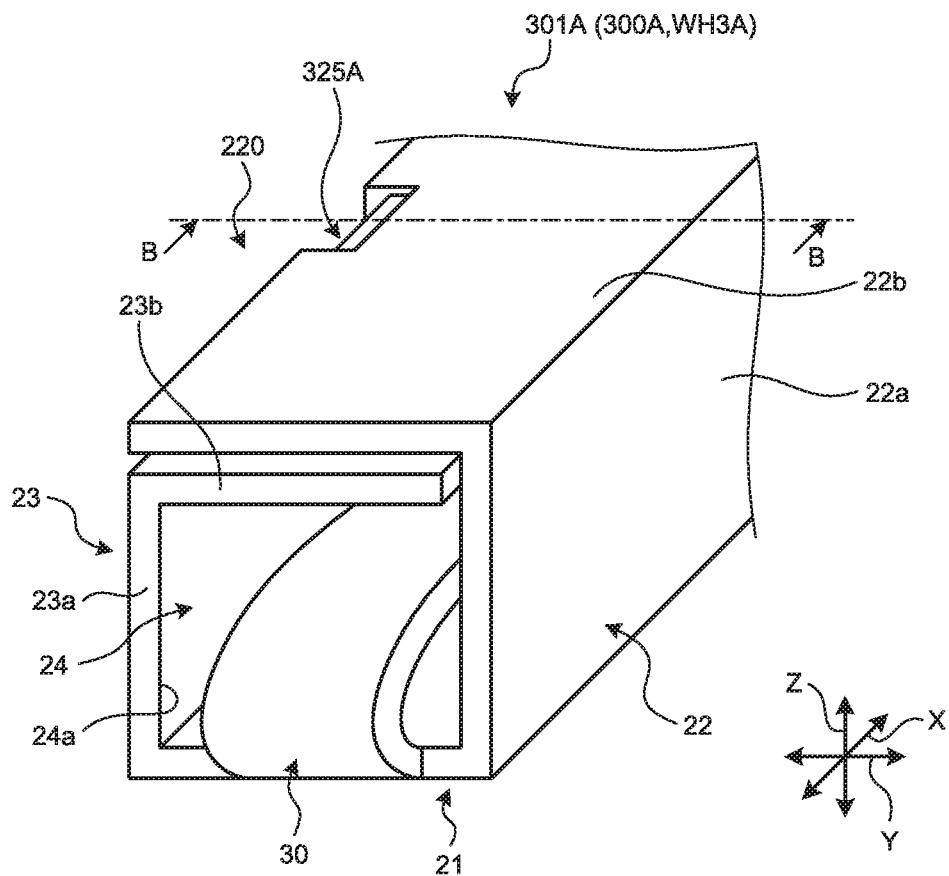
FIG. 13 is a schematic perspective view illustrating a schematic configuration of a terminal-attached electric wire according to a modified example.
Figure 14:
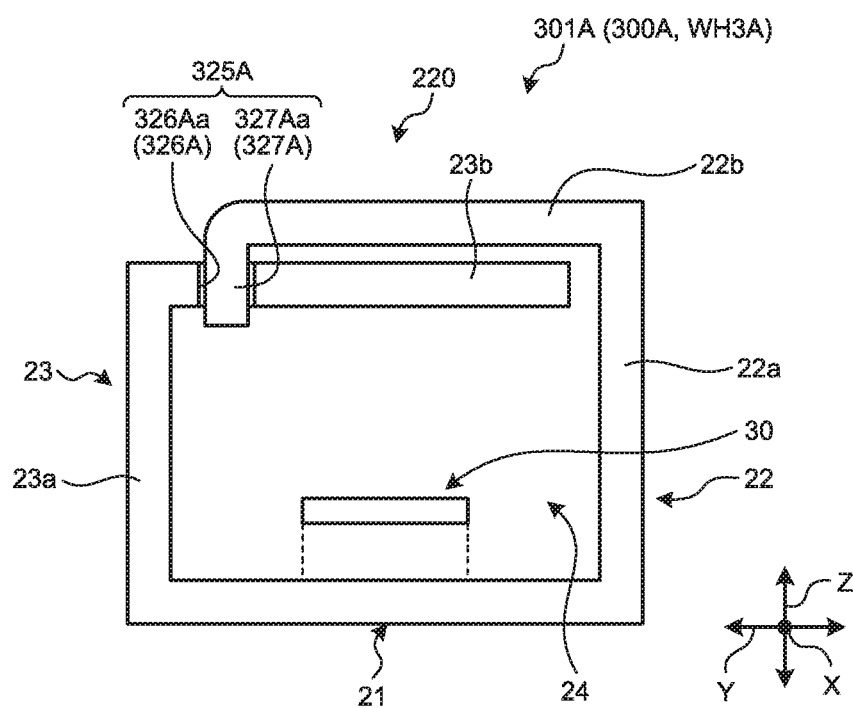
FIG. 14 is a schematic cross-sectional view illustrating the schematic configuration of the terminal-attached electric wire according to the modified example.

Note that, in the above description, the protrusion 327 is described to include the bead portion 327a, but is not limited to this. For example, a wire harness WH3A according to a modified example illustrated in FIG. 13 and FIG. 14 includes a terminal-attached electric wire 300A, and the terminal-attached electric wire 300A includes a metal terminal 301A. The wire harness WH3A, the terminal-attached electric wire 300A and the metal terminal 301A are different from the wire harness WH3, the terminal-attached electric wire 300 and the metal terminal 301, which are mentioned above, in including a displacement regulating portion 325A in place of the displacement regulating portion 325. Other configurations of the wire harness WH3A, the terminal-attached electric wire 300A and the metal terminal 301A are substantially similar configurations to those of the wire harness WH3, the terminal-attached electric wire 300 and the metal terminal 301, which are mentioned above. Note that FIG. 14 illustrates a cross-sectional view along a line B-B illustrated in FIG. 13.

The displacement regulating portion 325A of this modified example is different from the above-mentioned displacement regulating portion 325 in being configured to include a recess 326A and a protrusion 327A in place of the recess 326 and the protrusion 327. The displacement regulating portion 325A of this embodiment is a portion that is configured to include the recess 326A and the protrusion 327A and regulates the relative displacement between the pair of wall bodies 22 and 23 by these.

The recess 326A is provided in one of the wall bodies 22 and 23 which make a pair. The protrusion 327A is provided in the other of the wall bodies 22 and 23 which make a pair and is fitted to the recess 326A. The recess 326A of this embodiment is provided in the wall body 23 between the pair of wall bodies 22 and 23, and the protrusion 327A of this embodiment is provided in the wall body 22 between the pair of wall bodies 22 and 23.

Like the recess 326, the recess 326A is provided in the top surface portion 23b. Like the recess 326, the recess 326A of this embodiment is formed as a through hole 326Aa that penetrates the top surface portion 23b along the height direction Z. Then, in the top surface portion 23b, the through hole 326a of this modified example is formed at a position shifted to an end portion on the side wall portion 23a in the width direction Y.

Meanwhile, like the protrusion 327, the protrusion 327A is provided in the top surface portion 22b. Then, the protrusion 327A of this modified example is formed as a folded piece 327Aa in which, in the top surface portion 22b, a part of an end portion opposite to the side wall portion 22a side in the width direction Y is folded substantially perpendicularly toward the top surface portion 23b side along the height direction Z. The folded piece 327Aa is formed at a position and size of being fitted (inserted) to and penetrating the through hole 326Aa, which constitutes the recess 326A, along the height direction Z in a state in which the bottom body 21 and the pair of wall bodies 22 and 23 form such a box shape.

For example, the recess 326A and the protrusion 327A are molded at the time of molding the respective portions of the metal terminal 301A by pressing, folding and the like, and the protrusion 327A is set to a state of being fitted to the recess 326A. Like the displacement regulating portion 325, by the fact that the protrusion 327A is set to the state of being fitted to the recess 326A, the displacement regulating portion 325A of this modified example regulates the relative displacement between the top surface portion 22b and the top surface portion 23b, and as a result, regulates the relative displacement between the wall body 22 and the wall body 23.

Even in this case, like the above, the terminal attached electric ware 300A and the wire harness WH3A can ensure the appropriate conduction performance.

Fourth Embodiment

A terminal-attached electric wire and a wire harness according to a fourth Embodiment are different from those of the third embodiment in positional relationship between the recess and the protrusion which constitute the displacement regulating portion, and the like. Note that FIG. 15 to be described below illustrates a box-shaped portion as a schematic cross section. Moreover, FIG. 17 illustrates a cross-sectional view along a line C-C illustrated in FIG. 15.

Figure 15:
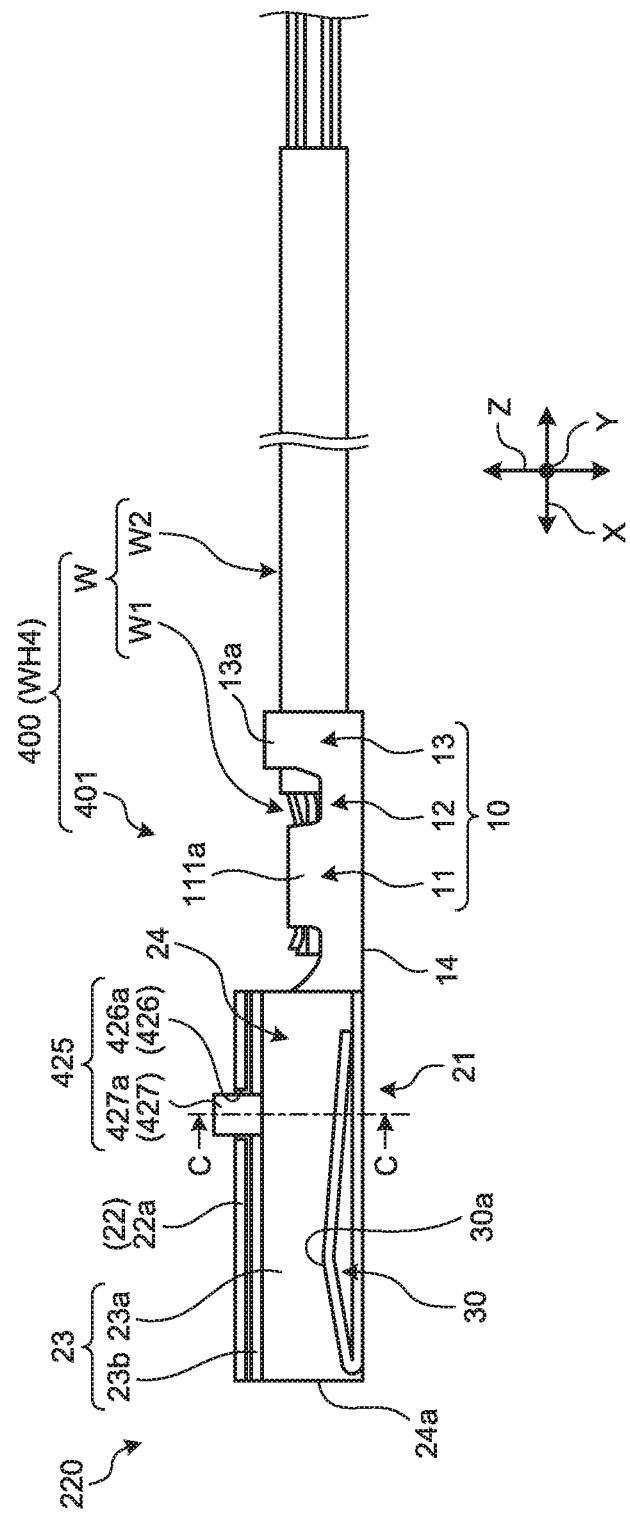
FIG. 15 is a schematic cross-sectional view illustrating a schematic configuration of a terminal-attached electric wire according to a fourth embodiment.
Figure 16:
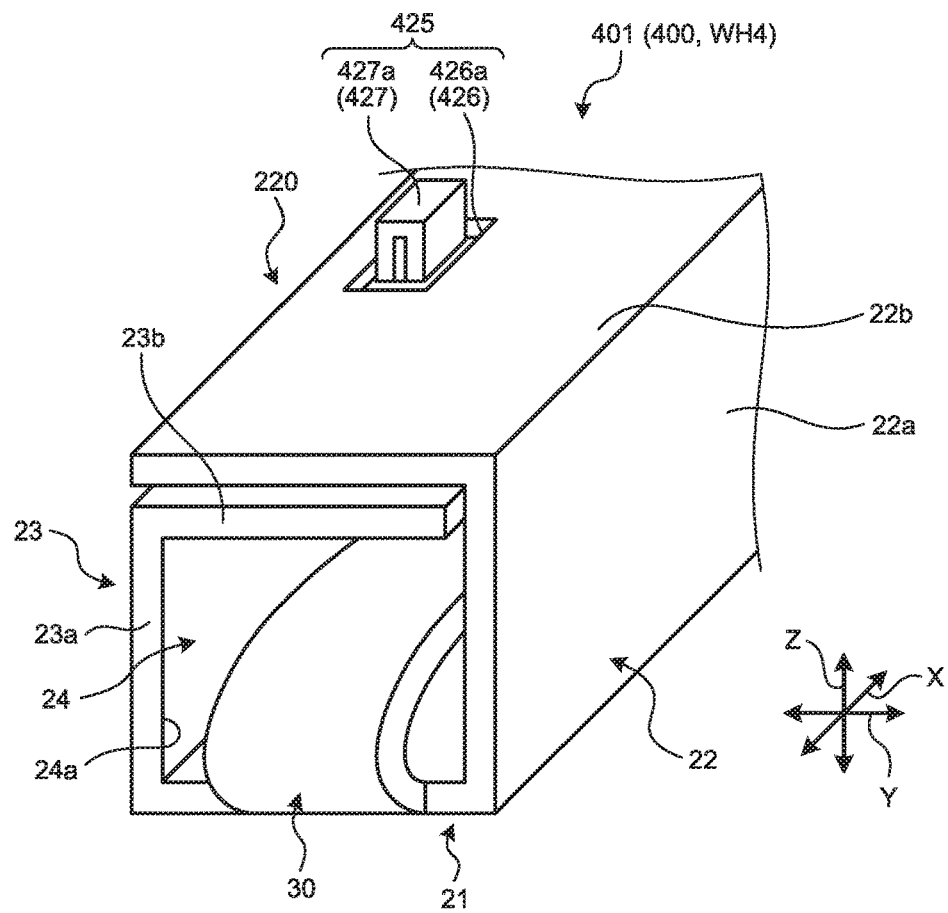
FIG. 16 is a schematic perspective view illustrating the schematic configuration of the terminal-attached electric wire according to the fourth embodiment.
Figure 17:
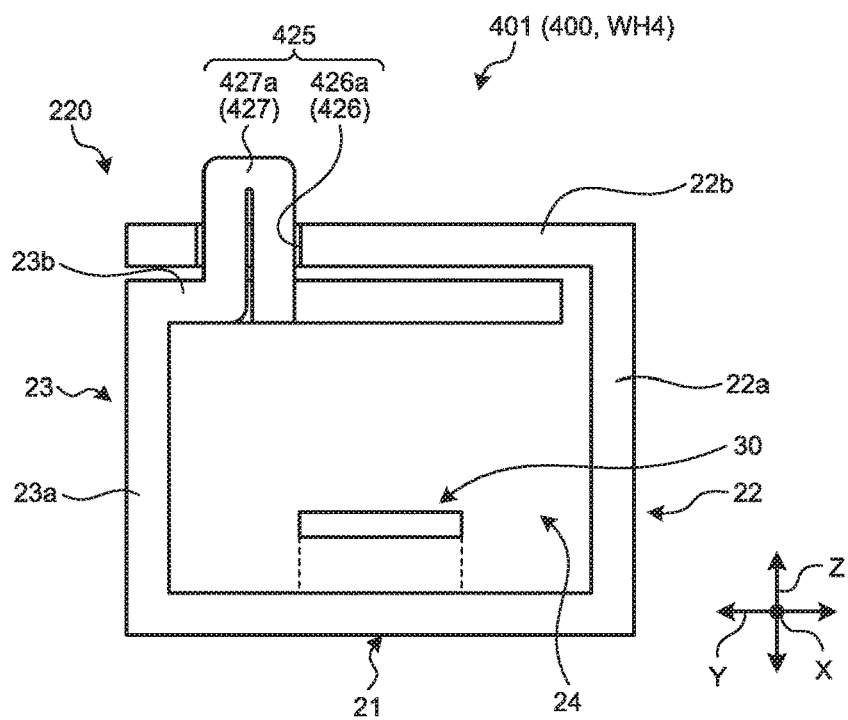
FIG. 17 is a schematic cross-sectional view illustrating the schematic configuration of the terminal-attached electric wire according to the fourth embodiment.

A wire harness WH4 of this embodiment, which is illustrated in FIG. 15, FIG. 16 and FIG. 17, includes a terminal-attached electric wire 400, and the terminal-attached electric wire 400 includes a metal terminal 401. The wire harness WH4, the terminal-attached electric wire 400 and the metal terminal 401 are different from the wire harness WH3, the terminal-attached electric wire 300 and the metal terminal 301, which are mentioned above, in including a displacement regulating portion 425 in place of the displacement regulating portion 325. Other configurations of the wire harness WH4, the terminal-attached electric wire 400 and the metal terminal 401 are substantially similar configurations to those of the wire harness WH3, the terminal-attached electric wire 300 and the metal terminal 301, which are mentioned above.

The displacement regulating portion 425 of this embodiment is different from the above-mentioned displacement regulating portion 325 in being configured to include a recess 426 and a protrusion 427 in place of the recess 326 and the protrusion 327. The displacement regulating portion 425 of this embodiment is a portion that is configured to include the recess 426 and the protrusion 427 and regulates the relative displacement between the pair of wall bodies 22 and 23 by these.

The recess 426 is provided in one of the wall bodies 22 and 23 which make a pair. The protrusion 427 is provided in the other of the wall bodies 22 and 23 which make a pair and is fitted to the recess 426. The recess 426 of this embodiment is provided in the wall body 22 between the pair of wall bodies 22 and 23, and the protrusion 427 of this embodiment is provided in the wall body 23 between the pair of wall bodies 22 and 23.

More specfically, the recess 426 is formed into a recessed shape in the top surface portion 22b of the wall body 22. That is, the recess 426 is provided in the top surface portion 22*b*, which is located on an opposite side (outside in the height direction Z) to the terminal insertion space portion 24 side between the pair of top surface portions 22*b* and 23*b*. The recess 426 of this embodiment is formed as a through hole 426*a* that penetrates the top surface portion 22*b* along the height direction Z. Here, in the through hole 426*a* that constitutes the recess 426, a cross-sectional shape thereof perpendicular to the height direction Z is formed into a substantially rectangular shape. In the top surface portion 22*b*, the through hole 426*a* is formed at a position shifted to an end portion opposite to the side wall portion 22*a* side in the width direction Y.

Meanwhile, the protrusion 427 is formed into a protrusion shape in the top surface portion 23*b* of the wall body 23. That is, the protrusion 427 is provided in the top surface portion 23*b*, which is located on the terminal insertion space portion 24 side (inside in the height direction Z), between the pair of top surface portions 22*b* and 23*b*. The protrusion 427 of this embodiment is formed as a folded piece 427*a* in which, in the top surface portion 23*b*, a part of an end portion opposite to the side wall portion 23*a* side in the width direction Y is folded substantially perpendicularly toward the top surface portion 22*b* side along the height direction Z, and further, is folded back toward the top surface portion 23*b* side. The folded piece 427*a* is formed at a position and size of being fitted (inserted) to and penetrating the through hole 426*a*, which constitutes the recess 426, along the height direction Z in a state in which the bottom body 21 and the pair of wall bodies 22 and 23 form the box shape.

For example, the recess 426 and the protrusion 427 are molded at the time of molding the respective portions of the metal terminal 401 by pressing, folding and the like, and the protrusion 427 is set to a state of being fitted to the recess 426. By the fact that the protrusion 427 is set to the state of being fitted to the recess 426, the displacement regulating portion 425 of this embodiment regulates the relative displacement between the top surface portion 22*b* and the top surface portion 23*b*, and as a result, regulates the relative displacement between the wall body 22 and the wall body 23.

The terminal-attached electric wire 400 and the wire harness WH4, which are described above, regulate the relative displacement between the pair of wall bodies 22 and 23 by the displacement regulating portion 425, thus making it possible to suppress the deformation of the box-shaped portion 220 itself and the spring contact portion 30 elastically deformably supported on the box-shaped portion 220. As a result, the terminal-attached electric wire 400 and the wire harness WH4 can ensure the appropriate conduction performance.

Here, the terminal-attached electric wire 400 and the wire harness WH4, which are described above, are configured to include the recess 426 formed in the top surface portion 22*b* and the protrusion 427 formed in the top surface portion 23*b*. With this configuration, the protrusion 427 is set to the state of being fitted to the recess 426, whereby the metal terminal 401 can regulate the relative displacement between the top surface portion 22*b* and the top surface portion 23*b*, and as a result, can regulate the relative displacement between the pair of wall bodies 22 and 23 by the displacement regulating portion 425. Here, the folded piece 427*a* that constitutes the protrusion 427 is fitted to the through hole 426*a* that constitutes the recess 426, and individual end surfaces thereof abut against each other, whereby the metal terminal 401 can surely regulate the pair of wall bodies 22 and 23 from being displaced so as to open to both sides in the width direction Y. Hence, the terminal-attached electric wire 400 and the wire harness WH4 can ensure the appropriate conduction performance as mentioned above.

Further here, the folded piece 427*a* that constitutes the protrusion 427 protrudes to the outside of the top surface portion 22*b* via the through hole 426*a* that constitutes the recess 426, whereby the terminal-attached electric wire 400 and the wire harness WH4 can cause the folded piece 427*a* to also function as a reverse insertion preventing protrusion. Here, the reverse insertion preventing protrusion is a protrusion that prevents the metal terminal 401 from being inserted into the housing of the connector C in a positional relationship different from an appropriate positional relationship. That is, the terminal-attached electric wire 400 and the wire harness WH4 can combine such a configuration for suppressing the deformation of the box-shaped portion 220 and the like and ensuring the appropriate conduction performance and such a configuration for preventing the metal terminal 401 from being reversely inserted into the housing of the connector C with each other, and accordingly, can effectively use the space.

Figure 18:
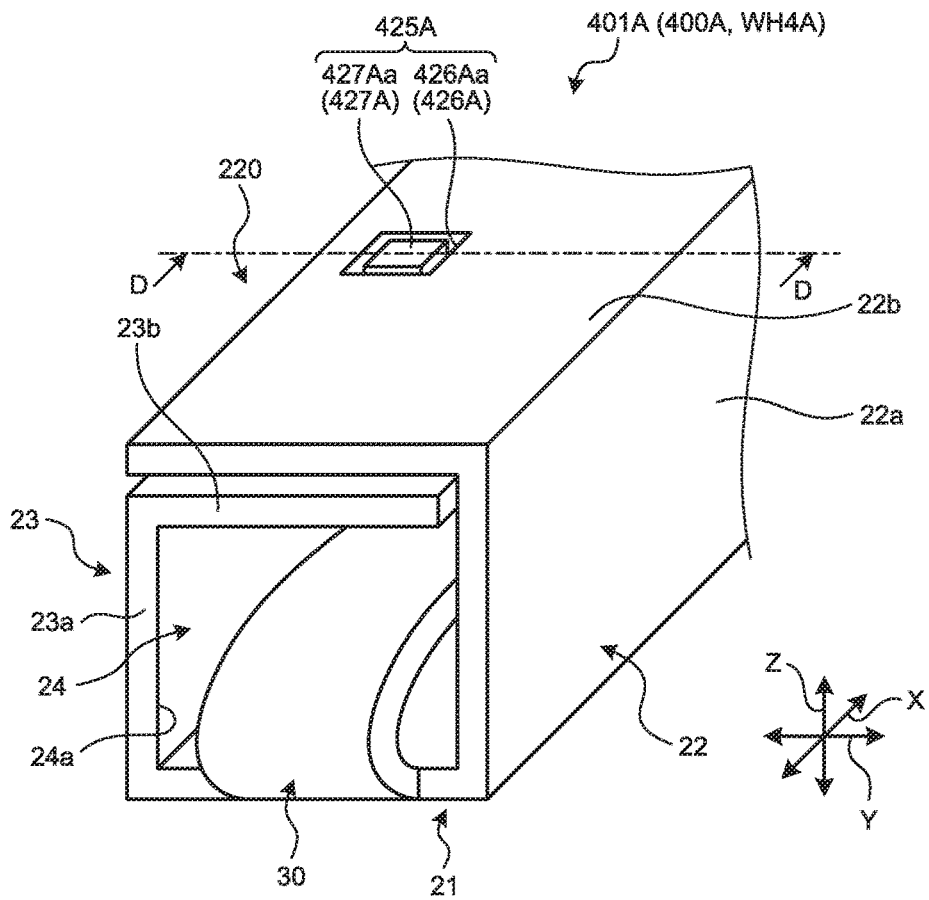
FIG. 18 is a schematic perspective view illustrating a schematic configuration of a terminal-attached electric wire according to a modified example.
Figure 19:
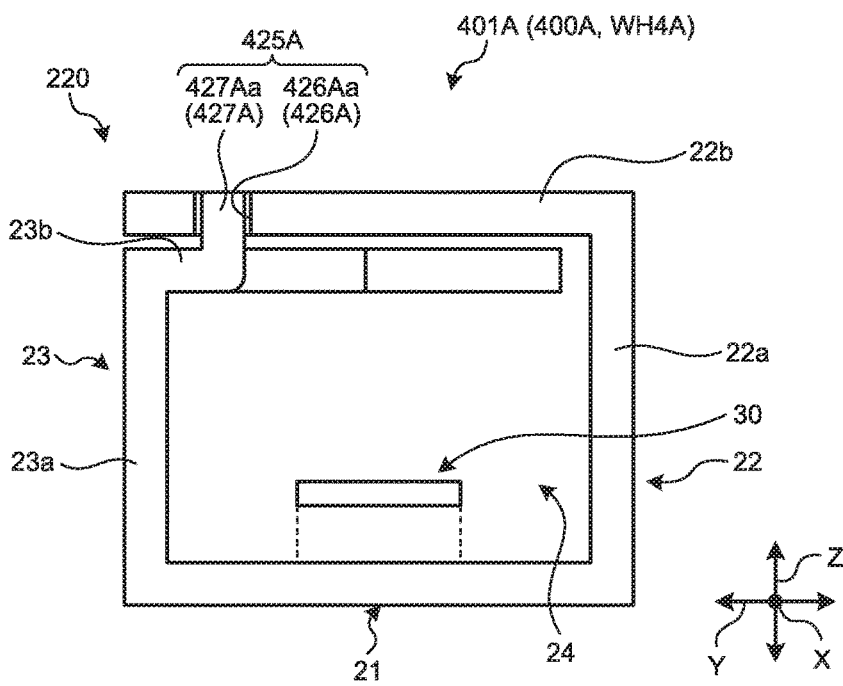
FIG. 19 is a schematic cross-sectional view illustrating the schematic configuration of the terminal-attached electric wire according to the modified example.

Note that, in the above description, the protrusion 427 is described to be composed of the folded piece 427*a*, but is not limited to this. For example, a wire harness WH4A according to a modified example illustrated in FIG. 18 and FIG. 19 includes a terminal-attached electric wire 400A, and the terminal-attached electric wire 400A includes a metal terminal 401A. The wire harness WH4A, the terminal-attached electric wire 400A and the metal terminal 401A are different from the wire harness WH4, the terminal-attached electric wire 400 and the metal terminal 401, which are mentioned above, in including a displacement regulating portion 425A in place of the displacement regulating portion 425. Other configurations of the wire harness WH4A, the terminal-attached electric wire 400A and the metal terminal 401A are substantially similar configurations to those of the wire harness WH4, the terminal-attached electric wire 400 and the metal terminal 401, which are mentioned above. Note that FIG. 19 illustrates a cross-sectional view along a line D-D illustrated in FIG. 18.

The displacement regulating portion 425A of this embodiment is different from the above-mentioned displacement regulating portion 425 in being configured to include a recess 426A and a protrusion 427A in place of the recess 426 and the protrusion 427. The displacement regulating portion 425A of this embodiment is a portion that is configured to include the recess 426A and the protrusion 427A and regulates the relative displacement between the pair of wall bodies 22 and 23 by these.

The recess 426A is provided in one of the wall bodies 22 and 23 which make a pair. The protrusion 427A is provided in the other of the wall bodies 22 and 23 which make a pair and is fitted to the recess 426A. The recess 426A of this embodiment is provided in the wall body 22 between the pair of wall bodies 22 and 23, and the protrusion 427A of this embodiment is provided in the wall body 23 between the pair of wall bodies 22 and 23.

Like the recess 426, the recess 426A is provided in the top surface portion 22*b*. Like the recess 426, the recess 426A of this embodiment is formed as a through hole 426Aa that penetrates the top surface portion 22*b* along the height direction Z.

Meanwhile, like the protrusion 427, the protrusion 427A is provided in the top surface portion 23*b*. Then, the protrusion 427A of this modified example is formed as a folded piece 427Aa in which, in the top surface portion 23*b*, a part of an end portion opposite to the side wall portion 23*a* side in the width direction Y is folded substantially perpendicularly toward the top surface portion 22b side along the height direction Z. The folded piece 427Aa is formed at a position and size of being fitted (inserted) to and penetrating the through hole 426Aa, which constitutes the recess 426A, along the height direction Z in a state in which the bottom body 21 and the pair of wall bodies 22 and 23 form such a box shape.

For example, the recess 426A and the protrusion 427A are molded at the time of molding the respective portions of the metal terminal 401A by pressing, folding and the like, and the protrusion 427A is set to a state of being fitted to the recess 426A. Like the displacement regulating portion 425, by the fact that the protrusion 427A is set to the state of being fitted to the recess 426A, the displacement regulating portion 425A of this modified example regulates the relative displacement between the top surface portion 22b and the top surface portion 23b, and as a result, regulates the relative displacement between the wall body 22 and the wall body 23.

Even in this case, like the above, the terminal-attached electric wire 400A and the wire harness WH4A can ensure the appropriate conduction performance.

Note that the terminal-attached electric wire and the wire harness according to the above-mentioned embodiments of the present invention are not limited to the above-mentioned embodiments, and are modifiable in various ways within the scope described in the scope of claims.

In the above description, the respective electric wires W of the terminal-attached electric wires 100, 100A, 100B, 200, 300, 300A, 400 and 400A are described to be those in which the metal terminals 1, 1A, 1B, 201, 301, 301A, 401 or 401A are provided on one end portions, and the other end portions are connected to one another by the ultrasonic bonding portions UW, but are not limited to this. For example, in the respective electric wires W, the metal terminals 1, 1A, 1B, 201, 301, 301A, 401 and 401A may be individually provided on both end portions. Then, the ultrasonic bonding portion UW may be a portion in which the conductor portions W1 exposed from the insulation coating portions W2 are subjected to the ultrasonic bonding in middle portions of the respective electric wires W.

In the above description, the wire harnesses WH1, WH1A, WH1B, WH2, WH3, WH3A, WH4 and WH4A are described to be those in which, in the respective terminal-attached electric wires 100, 100A, 100B, 200, 300, 300A, 400 and 400A, the electric wires W of the other residual terminal-attached electric wires 100, 100A, 100B, 200, 300, 300A, 400 and 400A serve as the connection counterpart electric wires WA, but are not limited to this. Under a condition in which the wire harnesses WH1, WH1A, WH1B, WH2, WH3, WH3A, WH4 and WH4A include the terminal-attached electric wires 100, 100A, 100B, 200, 300, 300A, 400 and 400A, each of which is at least one, the connection counterpart electric wires WA for the terminal-attached electric wires 100, 100A, 100B, 200, 300, 300A, 400 and 400A do not need to be the electric wires W of the terminal-attached electric wires 100, 100A, 100B, 200, 300, 300A, 400 and 400A.

In the above description, the wire harnesses WH1, WH1A, WH1B, WH2, WH3, WH3A, WH4 and WH4A are descried to be those including the ultrasonic bonding portions UW and having a structure in which the vibrations are applied to the metal terminals 1, 1A, 1B, 201, 301, 301A, 401 and 401A in the forming process of the ultrasonic bonding portions UW, but are not limited to this. The wire harnesses WH1, WH1A, WH1B, WH2, WH3, WH3A, WH4 and WH4A may be those which do not include the ultrasonic bonding portions UW and do not receive the transmission of the ultrasonic vibrations and the like to the metal terminals 1, 1A, 1B, 201, 301, 301A, 401 and 401A. Even in this case, the terminal-attached electric wires 100, 100A, 100B, 200, 300, 300A, 400 and 400A and the wire harnesses WH1, WH1A, WH1B, WH2, WH3, WH3A, WH4 and WH4A can ensure the appropriate conduction performance.

In the above description, the terminal-attached electric wires 100, 100A, 100B, 200, 300, 300A, 400 and 400A are described to be those applied to the wire harnesses WH1, WH1A, WH1B, WH2, WH3, WH3A, WHA, WH4A and the like, for example, for use in vehicles and the like, but are not limited to this.

The terminal-attached electric wire and the wire harness according to this embodiment may be composed by appropriately combining the constituents of the embodiment and the modified examples, which are described above, with one another.

In the terminal-attached electric wire and the wire harness according to the present embodiment, in a metal terminal, a counterpart terminal is inserted into a terminal insertion space portion of a box-shaped portion coupled to an electric wire connection portion. Then, in the metal terminal, the contact is formed of a spring contact portion, which is supported in the terminal insertion space portion, with the counterpart terminal. In such a configuration, the metal terminal includes a displacement regulating portion that regulates the relative displacement between a pair of wall bodies among a bottom body and the pair of wall bodies, which constitute the box-shaped portion. With this configuration, by the displacement regulating portion, the metal terminal can suppress deformation of the box-shaped portion itself and the spring contact portion elastically deformably supported on the box-shaped portion. As a result, the terminal-attached electric wire and the wire harness exert an effect of being capable of ensuring the appropriate conduction performance.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A terminal-attached electric wire comprising:
an electric wire having conductivity; and
a metal terminal provided on a terminal end of the electric wire, wherein the metal terminal includes:
an electric wire connection portion to which the electric wire is connected;
a box-shaped portion that is formed into a box shape by a bottom body coupled to the electric wire connection portion and a pair of wall bodies formed by protruding individually from both ends of the bottom body in a width direction, and enables a counterpart terminal to be inserted into a terminal insertion space portion in an inside thereof along an axial direction intersecting the width direction; and
a spring contact portion that is located inside the terminal insertion space portion, is elastically deformably supported in the box-shaped portion in a cantilever manner, and forms a contact with the counterpart terminal,
the box-shaped portion has a displacement regulating portion that regulates a relative displacement between the pair of the wall bodies, and
the displacement regulating portion is configured to include: a recess provided in one of the pair of the wall bodies by penetrating the one of the pair of the wall bodies; and a protrusion provided in the other of the pair of the wall bodies and is fitted to the recess.

2. The terminal-attached electric wire according to claim 1, wherein each of the pair of the wall bodies includes: a side wall portion that is formed by extending the bottom body along a height direction intersecting the axial direction and the width direction; and a top surface portion that is formed by extending the side wall portion along the width direction toward the other side wall portion, and faces the bottom body with the terminal insertion space portion interposed therebetween along the height direction, the recess is provided in the top surface portion located on the terminal insertion space portion side between a pair of the top surface portions, and the protrusion is provided in the top surface portion located on an opposite side to the terminal insertion space portion between the pair of the top surface portions.

3. The terminal-attached electric wire according to claim 1, wherein each of the pair of the wall bodies includes: a side wall portion that is formed by extending the bottom body along a height direction intersecting the axial direction and the width direction; and a top surface portion that is formed by extending the side wall portion along the width direction toward the other side wall portion, and faces the bottom body with the terminal insertion space portion interposed therebetween along the height direction, the recess is provided in the top surface portion located on an opposite side to the terminal insertion space portion side between a pair of the top surface portions, and the protrusion is provided in the top surface portion located on the terminal insertion space portion between the pair of the top surface portions.

4. The terminal-attached electric wire according to claim 1, wherein the spring contact portion is supported on the bottom body.

5. The terminal-attached electric wire according to claim 1, wherein the electric wire connection portion forms an ultrasonic bonding portion subjected to ultrasonic bonding to the electric wire.

6. A wire harness comprising:

at least one terminal-attached electric wire including an electric wire having conductivity and a metal terminal provided on a terminal end of the electric wire;

a connection counterpart electric wire connected to the electric wire; and an ultrasonic bonding portion in which the electric wire and the connection counterpart electric wire are subjected to ultrasonic bonding, wherein the metal terminal includes:

an electric wire connection portion to which the electric wire is connected;

a box-shaped portion that is formed into a tube shape by a bottom body coupled to the electric wire connection portion and a pair of wall bodies formed by protruding from both ends of the bottom body in a width direction, and enables a counterpart terminal to be inserted into a terminal insertion space portion in an inside thereof along an axial direction intersecting the width direction; and a spring contact portion that is located inside the terminal insertion space portion, is elastically deformably supported in the box-shaped portion in a cantilever manner, and forms a contact with the counterpart terminal, the box-shaped portion has a displacement regulating portion that regulates a relative displacement between the pair of the wall bodies, and the displacement regulating portion is configured to include: a recess provided in one of the pair of the wall bodies by penetrating the one of the pair of the wall bodies; and a protrusion provided in the other of the pair of the wall bodies and is fitted to the recess.

* * * * *